US012427419B2

(12) United States Patent  
Lopez Duarte

(10) Patent No.: US 12,427,419 B2  
(45) Date of Patent: Sep. 30, 2025

(54) METHODS AND SYSTEMS FOR FACILITATING GENERATING MUSIC IN REAL-TIME USING PROGRESSIVE PARAMETERS

(71) Applicant: Alvaro Eduardo Lopez Duarte, Riverside, CA (US)

(72) Inventor: Alvaro Eduardo Lopez Duarte, Riverside, CA (US)

(*) Notice: Subject to any disclaimer, the term of this patent is extended or adjusted under 35 U.S.C. 154(b) by 345 days.

(21) Appl. No.: 18/045,778

(22) Filed: Oct. 11, 2022

(65) Prior Publication Data

US 2023/0114371 A1 Apr. 13, 2023

Related U.S. Application Data

(60) Provisional application No. 63/253,875, filed on Oct. 8, 2021.

(51) Int. Cl.
*A63F 13/54* (2014.01)
*G10H 1/00* (2006.01)

(52) U.S. Cl.
CPC ........... *A63F 13/54* (2014.09); *G10H 1/0025* (2013.01); *A63F 2300/6081* (2013.01); *G10H 2210/026* (2013.01); *G10H 2210/115* (2013.01); *G10H 2210/125* (2013.01); *G10H 2210/325* (2013.01); *G10H 2210/371* (2013.01); *G10H 2210/576* (2013.01); *G10H 2220/116* (2013.01); *G10H 2240/056* (2013.01)

(58) Field of Classification Search
None
See application file for complete search history.

(56) References Cited

U.S. PATENT DOCUMENTS 5,099,740 A * 3/1992 Minamitaka ......... G10H 1/0025  
                                          84/DIG. 12
6,011,212 A * 1/2000 Rigopulos ................ G10H 1/42  
                                          84/610

(Continued)

FOREIGN PATENT DOCUMENTS

FR 2830664 A 12/2004

OTHER PUBLICATIONS

Openai, MuseNet, retrieved from Internet, retrieved on Oct. 11, 2022, <URL: https://openai.com/blog/musenet/>.

*Primary Examiner* — Seng H Lim

(57) ABSTRACT

The invention generates progressive music in real-time for video games using random, seeded random, and manually input variables to affect melody, phrase length, harmonic chords and complexity, and percussive accompaniment. As the game is played, variables may be passed in that change the music to increase or decrease complexity and tension levels and to interpolate between styles. The generated music then progresses from stable, simple, and consonant to more tense, dissonant, and complex melodies, harmonies and rhythms, and back to the original stage as a musical resolution. Through variables controlling musical parameters, music may progressively change from the atonal region where there is no clear resolution or stability, to tonal, where there is only consonance and stability, and anywhere in between. These variables are assigned through a middleware or a game-engine setup that uses the current device as an audio source plugin, or manually coded into the individual video game.

15 Claims, 19 Drawing Sheets

(56) References Cited

U.S. PATENT DOCUMENTS

| | | | |
|---|---|---|---|
| 6,051,770 A | 4/2000 | Milburn et al. | |
| 6,121,533 A | 9/2000 | Kay | |
| 6,506,969 B1 * | 1/2003 | Baron | G10H 1/0025 |
| | | | 84/613 |
| 9,471,271 B2 | 10/2016 | Georges et al. | |
| 10,228,901 B1 * | 3/2019 | Hirst | A63F 13/40 |
| 10,799,795 B1 * | 10/2020 | Kolen | G06N 3/08 |
| 11,344,808 B2 * | 5/2022 | Estanislao | A63F 13/79 |
| 11,699,420 B2 * | 7/2023 | Godunov | G06F 16/686 |
| | | | 84/601 |
| 12,053,700 B2 * | 8/2024 | Estanislao | A63F 13/79 |
| 2008/0066609 A1 * | 3/2008 | Bourgeois | G10H 1/0025 |
| | | | 84/609 |
| 2008/0156176 A1 * | 7/2008 | Edlund | G10H 1/0025 |
| | | | 84/609 |
| 2009/0193960 A1 * | 8/2009 | Cookerly | G10H 1/0025 |
| | | | 84/619 |
| 2020/0243055 A1 * | 7/2020 | Grace | H04L 67/131 |
| 2020/0306641 A1 * | 10/2020 | Kolen | A63F 13/54 |
| 2020/0406144 A1 * | 12/2020 | Estanislao | A63F 13/79 |
| 2021/0090537 A1 * | 3/2021 | Godunov | G10H 1/0066 |
| 2022/0122569 A1 * | 4/2022 | Caren | G10H 1/38 |
| 2022/0314117 A1 * | 10/2022 | Estanislao | A63F 13/54 |

* cited by examiner

METHODS AND SYSTEMS FOR FACILITATING GENERATING MUSIC IN REAL-TIME USING PROGRESSIVE PARAMETERS

FIELD OF THE INVENTION

The present invention relates generally to authoring systems and methods for applications such as games to be used on computers, game consoles, wireless phones, rides, or the likes. More specifically, the present invention is methods and systems for facilitating generating music in real-time for videogames using progressive parameters. Further, the present invention is concerned with an authoring tool for authoring media content such as music content and with a method therefor.

BACKGROUND OF THE INVENTION

The field of data processing is technologically important to several industries, business organizations, and/or individuals.

Existing techniques for facilitating generating music in real-time for videogames using progressive parameters are deficient with regard to several aspects. For instance, current technologies do not offer a full range of musical development starting from basic tonal progressions and simple meter and/or slow rhythmic activity to an atonal, dense, intense, and rhythmically, melodically, and harmonically complex music stream. Furthermore, current technologies do not adapt real-time music generation stream progressively to real-time variables coming from a videogame. Further, current technologies do not offer human-like performance characteristics through parametric stochastic algorithms in the MIDI output. Moreover, current technologies do not facilitate providing real-time continuous control of the tension or complexity on music material through time resulting in music development.

Therefore, there is a need for improved methods and systems for facilitating generating music in real-time for videogames using progressive parameters that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

According to some embodiments, a method for facilitating generating music in real-time for videogames using progressive parameters is disclosed. Accordingly, the method may include receiving, using a communication device, at least one music parameter associated with gameplay variables from at least one user device associated with at least one user. Further, the at least one user may include an individual, an institution, and an organization that may want to develop a videogame (or game). Further, the at least one user may include a game developer. Further, the game developer may assign the gameplay variables to the at least one music parameter. Further, the method may include generating, using a processing device, a plurality of outputs based on the at least one music parameter and the gameplay variables. Further, the method may include adjusting, using the processing device, orchestration variance of the plurality of outputs based on an orchestration algorithm. Further, the method may include retrieving, using a storage device, a music parameter preset. Further, the method may include interpolating, using the processing device, two or more music parameter presets. Further, the method may include analyzing, using the processing device, the interpolated music parameter preset based on a tension or complexity algorithm. Further, the method may include controlling, using the processing device, the tension or complexity parameters associated with the music parameter preset based on the analyzing of the interpolated music parameter preset to generate a music output. Further, the method may include transmitting, using the communication device, at least one of the music outputs and the music parameter preset to the at least one user device. Further, the method may include storing, using the storage device, the music parameter preset.

According to some aspects, a system for facilitating generating music in real-time for videogames using progressive parameters is disclosed. Accordingly, the system may include a communication device configured for receiving at least one music parameter associated with gameplay variables from at least one user device associated with at least one user. Further, the at least one user device may include a laptop, a mobile, a personal computer, etc. Further, the at least one user may include a game developer. Further, the at least one user may assign variables and compile the game. Then a player maybe a final user and may employ the game in a range of devices. Further, the at least one music parameter may be associated with real-time music variables of a video game. Further, the communication device may be configured for transmitting at least one of a music output and a music parameter preset to the at least one user device. Further, the system may include a processing device configured for generating a plurality of outputs based on the at least one music parameter. Further, the plurality of outputs may include a melody output, harmony output, and percussion output. Further, the processing device may be configured for adjusting orchestration variance of the plurality of outputs based on an orchestration algorithm. Further, the processing device may be configured for interpolating two or more music parameter presets. Further, the processing device may be configured for analyzing the interpolated music parameter preset based on a tension or complexity algorithm. Further, the processing device may be configured for controlling the tension or complexity parameters associated with the music parameter preset based on the analyzing of the interpolated music parameter preset to generate the music output. Further, the controlling of the tension or complexity parameters may be associated with relative location among the music parameter presets (preset interpolation). Further, the system may include a storage device configured for retrieving the music parameter preset. Further, the storage device may be configured for storing the music parameter preset.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTIONS OF THE INVENTION

Figure 1:
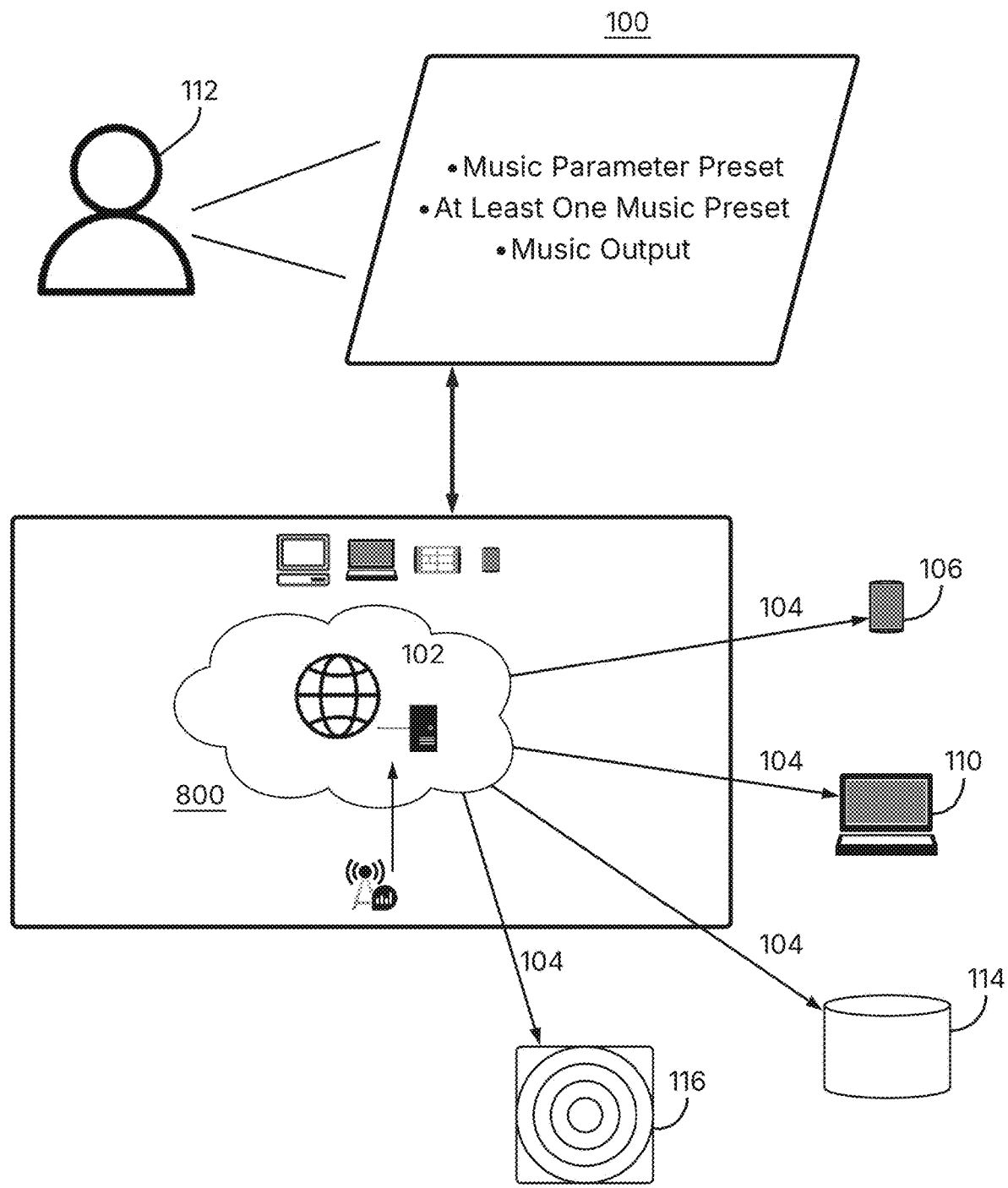
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods and systems for facilitating generating music in real-time for videogames using progressive parameters, embodiments of the present disclosure are not limited to use only in this context.

Overview

The present disclosure describes methods and systems for facilitating generating music in real-time for videogames using progressive parameters. The disclosed system may be associated with a software platform that generates music in real-time using progressive parameters. Music output in the exemplary embodiment of the invention is in the form of MIDI, with values for pitch, velocity, and duration, divided into multiple instrument channels. Other output such as music controller information and analytical data may also be output for the invention, separate from the MIDI music.

Further, Progressive Algorithmic Adaptive Music Generator for Videogames (PAAMGV), an exemplary embodiment of the disclosed system herein, generates a real-time stream of music that can progress in several dimensions of complexity using multiple parameters set by the user and modified by real-time variables coming from a videogame. Further, a multi-parameter preset associated with the disclosed system may be called a style. It is assignable to an interpolation algorithm. The music may progress adding or diminishing tension or complexity using single parameters and/or the style interpolation algorithm.

To generate a musical track, the present invention begins uses a clock that produces a time grid for musical events that may arise. The clock produces a loop of indexed pulses, called a Count Loop, that is used by various elements of the invention to produce synchronous musical elements. The size of this loop is determined by the chosen number of beats multiplied by the number of subdivisions required for each beat (also called the Grain or pulse subdivision). The parameters for the clock are then Musical Tempo, Loop Size, and Grain.

Furthermore, PAAMGV comprises a three-agent network generating melody, harmony, and percussion respectively. Melody and Harmony output may be assigned to four different instruments chosen by the user in their midi channels. Further, the disclosed system may be based on an algorithm that also can handle orchestration variance by addition/subtraction of instrument layers. Further, the user employs the parameters to achieve a particular texture (style) and then saves it as a preset and interpolate between them creating new developments. Further, the PAAMGV is comprised of at least one agent network with at least one melody agent (MA), at least one harmony agent (HA), at least one percussion agent (PA), and at least one orchestrator agent (OA), a multi-parameter preset interpolator and global features controller (MPIC), and a system user interface to visualize and control agent features, global parameters, multi-parameter presets, and their interpolated values.

Further, the disclosed system offers a full range of musical output starting from basic tonal progressions and simple meter and/or slow rhythmic activity to an atonal, dense, intense, and rhythmically, melodically, and harmonically complex music stream. The disclosed system stores multi-parameter presets that can be described as styles or developments and interpolate among them. The music can progress adding or diminishing tension and/or complexity using single parameters and/or interpolating among presets. Further, PAAMGV provides real-time continuous control of tension or complexity increase/reduction on music material through time resulting in music development. This is perceived as a relative change in music complexity. This is achieved by algorithms that change musical generation features linearly and incrementally. Seeded pseudo-random number generators provide self-similarity and also possibilities for sequence alternation. Further, the seeded pseudo-random number generators are used in a number of aspects of music generation providing self-similarity, variation and recall, possibilities for sequence alternation, and human-like performance qualities.

Further, at least one melody agent generates an accent system that governs rhythm on harmony and percussion agents. Further, the at least one melody agent may generate melody line based on its parameters, set by the user and modifiable by the videogame variables, and the harmony configuration produced by HA, and also generates and manages a base accent configuration pattern used as a reference by other agents and modules. It also features a custom-amount shape.

First, the melody agent generates a rhythm. A list of onsets is created correlated with each beat (Loop Size/Grain), which may randomly be offset by a syncopation amount. Syncopation may be achieved either by "move odd" or "move even" to offset onto odd or even pulses between the beat. In practice, these odd or even movements reflect syncopation by either a 16th note or 8th note. For example, a loop of size 16 may consist of 4 beats with a Grain of 4. Each individual index in the loop then represents a 16th note, and "moving odd" up 1 index would produce syncopation on the 16th note. "Moving even" would increment 2 indexes and create a syncopation on the 8th note. This list of beats is known as a Beat List. Further, a pattern of motion may be set to change the syncopation as a song progresses. This pattern of motion, known as a Moved List, is combined with the Beat List to create a progressive change in the syncopated beat if desired. The Moved List may be further modified by adding or subtracting onsets progressively through a seeded random generator, using incremental subdivisions of the pulse. Finally, a seeded random sequence of binary staccato/legato Boolean values is applied to the available onsets, assigning a duration value of either staccato or legato to each onset. The duration value uses a minimum loop unit (the Grain). The number of staccato versus legato notes is controlled by a "Staccato-Legato value" that produces more staccato notes when the parameter value is high, and more legato notes when the parameter value is low. The resulting application of weighted staccato-legato value to the onsets to calculate duration results in a collection of onset values and their durations, with 0 representing a non-onset, 1 representing a staccato value, and a non-zero value for legato.

Next, the melody agent generates a velocity, also known as amplitude of the MIDI or loudness. Using a random walk sequence and an input velocity parameter value, an accent value is assigned to onsets from the Moved List. Each individual onset is mapped to a velocity value.

Next, the melody agent generates pitches, comprising parameters of step for maximum interval, range for total range of action, and a non-repeat Boolean. To assign pitches in real time, known as a note stream, one of two possible random walk sequences is used—drunk, or drunk contour mode. Drunk mode uses a note-by-note random walk sequence and receives a seed to restart the sequence. Drunk contour mode applies the random walk sequence to the Moved List onsets and interpolates between them to create a contour with the duration of one loop. The melody may optionally be inverted by a Boolean parameter, invert, to apply a melody inversion based on the mean pitch value. Both random walk sequences return a pitch value. Next, a transposition parameter value is applied that adds or subtracts to the pitch value, based on transposition offsets from other algorithms to react to phrasing, melody change, and lack of change in the register. Finally, the melody pitch generation uses a harmony filter that uses the list of pitches generated by the random walk sequence, with transposition applied. The harmony filter then outputs a grid of individual pitch values that have been re-pitched using a known harmony.

Next, the melody agent shapes the melody. Using a 2D table, modification values are assigned for transposition as the melody progresses. Parameters comprise depth as a value of influence, length as a value of loops that it takes to complete, and invert as a Boolean, also used by the Drunk contour random walk sequence.

Next, the melody agent determines possible melody change, including transposition and phrasing changes. For transposition, a window of previous pitches and their duration is stored, and the range, register, and number of pitches is analyzed. After a finite number of phrases, a transposition offset is applied. For phrase changes, a chord denomination (such as I, ii, IV, V), passed from the Harmony Agent alters the melody at a specific number of onsets to reflect tonal phrase resolutions in melody and rhythm.

Next, the melody agent constructs the MIDI stream. Using the length, velocity, and pitch stream, a melody MIDI event stream is produced.

Further, the at least one harmony agent generates a harmonic progression and a harmonic grid based on its parameters, set by the user and modifiable by the videogame variables, which are used as a reference by other modules and agents to generate phrasing. It features harmonic complexity and tension algorithms allowing linear increase/decrease of said characteristics in the music output. Also using its parameters and videogame's variables, it generates a sequence of chords using as a reference the base accent configuration pattern and its own voicing algorithm. Other stochastic algorithms adapt real-time music generation stream progressively to real-time variables coming from a videogame and offer human-like performance characteristics used in the MIDI output. Specifically, the harmony agent comprises a harmony rhythm generation, harmony velocity generation, harmony sequence generation, and harmony change algorithm.

The harmony rhythm generation first applies accents from the moved list and beat list from the melody agent to create an interpolated list of values at each index of the loop. A seeded random generator is the applied to progressively adhere to the moved list producing syncopation or to the beat list for each onset, producing an accent/beat follower list. This resulting accent/beat follower list then has onsets added or subtracted for introducing changes to the harmony with a seeded random value to determine at which onsets changes may occur. Finally a staccato-legato duration is applied, much like in the melody agent, that calculates staccato or legato and returns a collection of values at each index of the loop where 0 means not onset, 1 means staccato, and a nonzero value indicates legato duration.

Next the velocity is applied to the harmony agent, giving accent (higher velocity value) to the onsets from the moved list from the melody agent. Each chord onset or arpeggio pitch (both methods of producing harmonic accompaniment) is assigned a velocity value.

Next a harmonic sequence is generated. First, an incremental amount of chord changes is determined based on the currently available harmony onsets. Based on a harmonic rhythm speed variable, chord change frequency may be controlled. Additionally, harmonic changes are prevented between the start of the last beat and beginning of the next loop to allow for longer resolutions. Next, the chord pools manager stores and manages harmonic content and progression in a phrase. Using a parameter value for complexity, the chords pool manager establishes the number of chord pools (collections of chord possibilities) and selects harmonic content available for each complexity level. The amount of chord pools and their content changes progressively with the complexity level (e.g., at complexity value 3 there are 3 ordered chord pools from which chords available belong to level 3). Also, for the first four chord pools levels, the Boolean Major/Minor parameter enables chords form the selected category. Each chord pool has a timely place in the progression (ordered), which means that chord pool #1 can only be followed by chord pool #2, or by #1 again. This means that more pools are present on higher complexity levels. Also, first pools are present in more levels so they have more level possibilities than the higher pools. The Chord Pool # is used as a reference for other processes to do phrase quantization (allow changes only at the end/beginning of a phrase). The chords in a chord pool are designed to connect to those found in contiguous chord pools, following usual western progression sequences. Currently, the algorithm holds a maximum of eight chord pools per phrase and nine complexity levels. This enables longer and increasingly complex progressions and also responsive level-change reaction in the middle of a phrase. The input is a trigger that executes a chord selection from the following pool using a seeded random generator. It returns a symbol—I, ii, V, etc.—that pairs with the harmonic tension parameter to query the Chord Dictionary, whose output is the Pitch Class List for harmony and melody that feeds their respective filters. The melody list adds 3-1 levels (i.e., pitches) on lower harmonic tensions to provide interpolation possibilities. As a feature, a random generator uses a normal distribution to decide if the progression modulates in next round, when there are dominant chords. The progression may continue with the next box if no modulation is decided or change the root (tonic pitch class value) and select Chord Pool #1 for next round. The bass selector provides possibilities for the lowest pitch used in the chord builder (see below) according to the complexity level and the chord pool number. The unit is an index of the chord list #5 for each chord found in the Chord Dictionary. This particular list has five pitch classes (e.g., I: 0, 4, 7, 11, 2). For example, if a I is followed by 1, the chord is going to use as bass the first pitch class of the list #5 which is the root. The number 2 would be the major third (4), and the 3 the fifth (7) in a similar way inversions are classified in the western canon. The Chord Dictionary is a collection of pitch-class lists for every chord, organized in the western tonal music classification (e.g., I, IV, V, vi, vii°, etc.) Every chord key holds a series of lists that incrementally add pitch-classes based on the relative dissonance with the root, using the harmonic tension parameter value (1-12). A query based on the tension value outputs a list of pitch classes normalized to C. The tonic pitch class value transposes the list to the current tonality (mod 12). The resulting pitch class list passes through a filter that shifts the numbers to match a pitch class set that belongs to non-diatonic collections to introduce a level of dissonance if the Dim toggle is activated. The result is a similar pitch class set whose dissonance is instantaneously higher than the original. Using the pitch class list for harmony that comes from Chord Dictionary (key is the chord and the list number for harmonic tension), it builds a whole-range list of possible pitch classes. Then, using the Voices, Range, Register, and the bass pitch class selected, it builds a list of pitches used for playback either as a vertical chord triggered by the onset stored on the Harmony Rhythm collection, or as arpeggio. Its algorithm organizes interval classes from larger in the bass to shorter in the higher register to emulate orchestration. Using the movement parameter, it shifts the chords in the register going up/down for every onset restarting with the loop. The maximum range depends on the onsets per loop and the range established by the movement parameter. Next the orchestration configuration is used to generate an arpeggiator. The orchestration configuration (see orchestrator flags), combined with the Melody and Harmony +/− onsets parameter values, the complexity parameter value, and the size value, is used to determine a rate (¼, ⅛, ⅛ triplet, ¹⁄₁₆, and ¹⁄₃₂ note) and a shape (up, down, and up&down) of the arpeggiator, and also triggers a flip switch (on/off). Arpeggiator speed possibilities are conditioned to avoid faster melodies and/or chord onsets, turn off if brass is solo, and turn non-solo brass off if the arpeggiator is on. An arpeggio generator then assigns an arpeggio to the current chord voices, calculates and updates the arpeggio rate using current tempo, and sends the pitches for playback. Its parameters are switch on/off, arpeggio rate value (¼, ⅛, ⅛ triplet, ¹⁄₁₆, and ¹⁄₃₂ note), and arpeggio shape (up, down, and up & down).

The produced harmony is then passed through a harmony change algorithm that, using the existing chords produced, prepares and sends offset values for the parameter. Variations are classified in default and dominant, and harmony change is executed when there has not been a change in parameters for a selected number of phrases, weighted by a randomly generated seed. Finally a harmony MIDI event stream is created using the length, velocity, and pitch values. For each index in the count loop, a chord or arpeggio is produced if desired. Then a duration (either staccato or legato) and velocity value is joined with the chord pitches to prepare the harmony MIDI event stream for combination with the melody stream and percussion rhythm.

Further, the at least one percussion agent generates multiple percussion instrument sequences employing its parameters, set by the user and modifiable by the videogame variables, and the base accent configuration pattern as a reference. Specifically, the percussion agent comprises a percussion rhythm generation, velocity generation, ratchet, and percussion change.

First, the percussion rhythm generation uses the Moved List and the Beat list to interpolate and add syncopation for all percussion instruments, resulting in an interpolated list of onset loop indexes. Next, for each percussion instrument, using the interpolated list of onset loop indexes, additive and subtractive filling is applied with parameters for Kick/Snare, Toms, Cymbals +/− onsets. The onsets are distributed between the Kick drum and snare drum timbres, based on a consecutive value that sets how many snare drums are consecutive before a kick drum appears, and an offset that may shift the pattern.

Next, much like for the melody and harmony agents, a velocity value is applied for each percussion instrument, giving higher accent (higher velocity value) to onsets from the Moved List.

Next, for all instruments besides the kick drum, a ratchet is applied. Based on the +/− onsets value for each instrument, a ratchet is executed only on lower values in relation to the loop Size, using a random generator to decide the type of ratchet (length and onsets value). Velocity for each ratchet is also calculated.

Next, similar to the melody and harmony agents, a percussion change algorithm sends a trigger to percussion instruments to offset their parameters based on current chords. Variations are classified as tonic, dominant, and default. The percussion change algorithm may also shift the consecutive value from the kick/snare and +/I onsets for all instruments using a random generator so support phrasing, with a specific bipolar range for each instrument.

The velocity and pitch values, along with an arbitrary constant length (300 ms in the exemplary embodiment), are then used to produce a real-time sequence of percussive MIDI events, to be combined with the melody and harmony agents.

Further, the Orchestration Agent works on the MA and HA music events output by choosing and assigning them to a single or multiple instrument routed to MIDI channels as its output. OA also features an orchestration variance algorithm that adds/subtracts instrument layers based on its parameters, supporting a wide range of emotional intensities. The OA may also control distribution of instrument families, such as all brass instruments, to reduce intensity based on number of overlapping instruments. After two phrases with no other orchestration changes, random instrument switches are introduced. Additionally, the OA controls pitch range among instrument voices from the melody agent using an "orchestral range" parameter applied to the pitch class list. Further, the OA may send flags to the arpeggiator algorithm for brass solo or piano solo to turn the arpeggiator on or off. Further, the OA manages pitch ranges for instrument families to maintain natural pitches for instruments in that family, and combines the melody agent stream, harmony agent stream, and percussion agent stream to produce a final series of MIDI events.

Further, MPIC associated with the disclosed system stores multi-parameter presets set by a user and features an interpolation algorithm to linearly modify a number of parameters on each agent. Each multi-parameter preset can be employed by the user to achieve a plurality of textures, styles, or developments that seamlessly transition among them by using continuous interpolation placement through time. A group of multi-parameter presets can be understood as a theme and each preset as a style. The interpolation among preset slots (styles) provides seamless musical transitions among them within a theme. In the exemplary embodiment, there are four presets per theme, and the interpolation is executed by three XY pads for each of the agents—the preset positions are in the four corners. The cursors' coordinates on the XY pads are used to calculate interpolation. The presets can be elaborated as progressive developments that branch from an original mood. In addition, individual parameters can be offset during playback and will keep their relative position during interpolation or return to the interpolated value using the reset interpolator trigger. In the exemplary embodiment, it is possible to save a multi-parameter preset that includes all the agents' parameters in each of the four theme's slots. Then, to assign the theme to the interpolator, the user clicks in the preset row header, populating the four corners of the XY pads with the presets (1st: lower-left, 2nd: lower-right, 3rd: upper-left, 4th: upper-right).

Further, the present invention includes a seeded phrase generator that takes the seed values for rhythm and pitch and adds a seeded random value for every new Chord pool, restarting the sequence at Chord pool #1 (phrase start), to provide a sequence of seeds whose length can change the behavior of the music content for every chord, or provide a level of recurrence by phrase. The length of this sequence is set by the Seeded Phrase Length parameter, which is the number of values to be added to the first seed. If the current seed is 0, the random generators produce non-seeded values (the seed taken is date and time), which is ideal for 'improvisational' passages Further, PAAMGV may be a software compiled in the form of a plugin for videogame developer engine or for audio middleware that can integrate with the videogame engine to be able to compile and build its logic and capabilities into a new videogame.

Further, the disclosed system may not require a pre-made piece of music to operate, therefore music output does not incur plagiarism.

Further, in an embodiment, a videogame engine (e.g., Unreal Engine, Unity, etc.) may receive information about the music from a music engine associated with the disclosed system. Further, the videogame engine may assign its variables to activate, modify and/or correlate any gameplay feature according to music events or features such as onsets, pitch-class (or pitch class distribution), melodic shape, progression, and phrasing, in addition to any individual parameter.

FIG. 1 is an illustration of an online platform 100 consistent with various embodiments of the present disclosure. By way of non-limiting example, the online platform 100 for facilitating generating music in real-time for videogames using progressive parameters may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers, etc.), databases 114, and sensors 116 over a communication network 104, such as, but not limited to, the Internet. Further, users of the online platform 100 may include relevant parties such as, but not limited to, end-users, video game players, service providers, and administrators. Accordingly, in some instances, electronic devices operated by the one or more relevant parties may be in communication with the online platform 100.

A user 112, such as the one or more relevant parties, may access the online platform 100 through a web-based software application or browser. The web-based software application may be embodied as, for example, but not be limited to, a website, a web application, a desktop application, and a mobile application compatible with a computing device 800.

Figure 2:
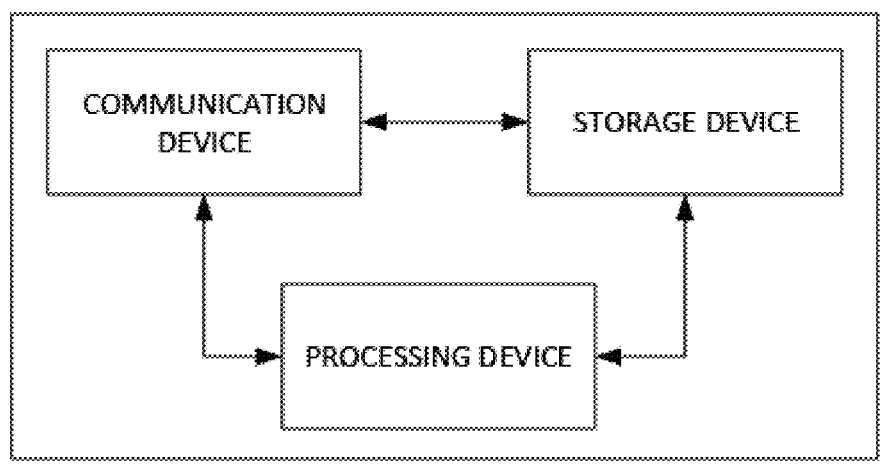
FIG. 2 is a block diagram of a system for facilitating generating music in real-time for videogames using progressive parameters, in accordance with some embodiments.

FIG. 2 is a block diagram of a system for facilitating generating music in real-time for videogames using progressive parameters, in accordance with some embodiments. Accordingly, the system may include a communication device configured for receiving at least one music parameter associated with gameplay variables from at least one user device associated with at least one user. Further, the at least one user device may include a laptop, a mobile, a personal computer, etc. Further, the at least one user may include a game developer. Further, the at least one user may assign variables and compile the game. Then a player maybe a final user and may employ the game in a range of devices. Further, the at least one music parameter may be associated with real-time music variables of a video game. Further, the communication device may be configured for transmitting at least one of a music output and a music parameter preset to the at least one user device.

Further, the system may include a processing device configured for generating a plurality of outputs based on the at least one music parameter. Further, the plurality of outputs may include a melody output, harmony output, and percussion output. Further, the processing device may be configured for adjusting orchestration variance of the plurality of outputs based on an orchestration algorithm. Further, the processing device may be configured for interpolating two or more music parameter presets. Further, the processing device may be configured for analyzing the interpolated music parameter preset based on a tension or complexity algorithm. Further, the tension or complexity algorithm may facilitate changing of musical generation features linearly and incrementally. The addition of tension or complexity, not only on progression length, chord type, and pitch-class addition/subtraction, but also on rhythmical development offers a full range of musical output starting from basic tonal progressions and simple meter and/or slow rhythmic activity to an atonal, dense, intense, and rhythmically, melodically, and harmonically complex music stream. Further, the processing device may be configured for controlling the tension or complexity parameters associated with the music parameter preset based on the analyzing of the interpolated music parameter preset to generate the music output. Further, the system may include a storage device configured for retrieving the music parameter preset. Further, the storage device may be configured for storing the music parameter preset.

Figure 3:
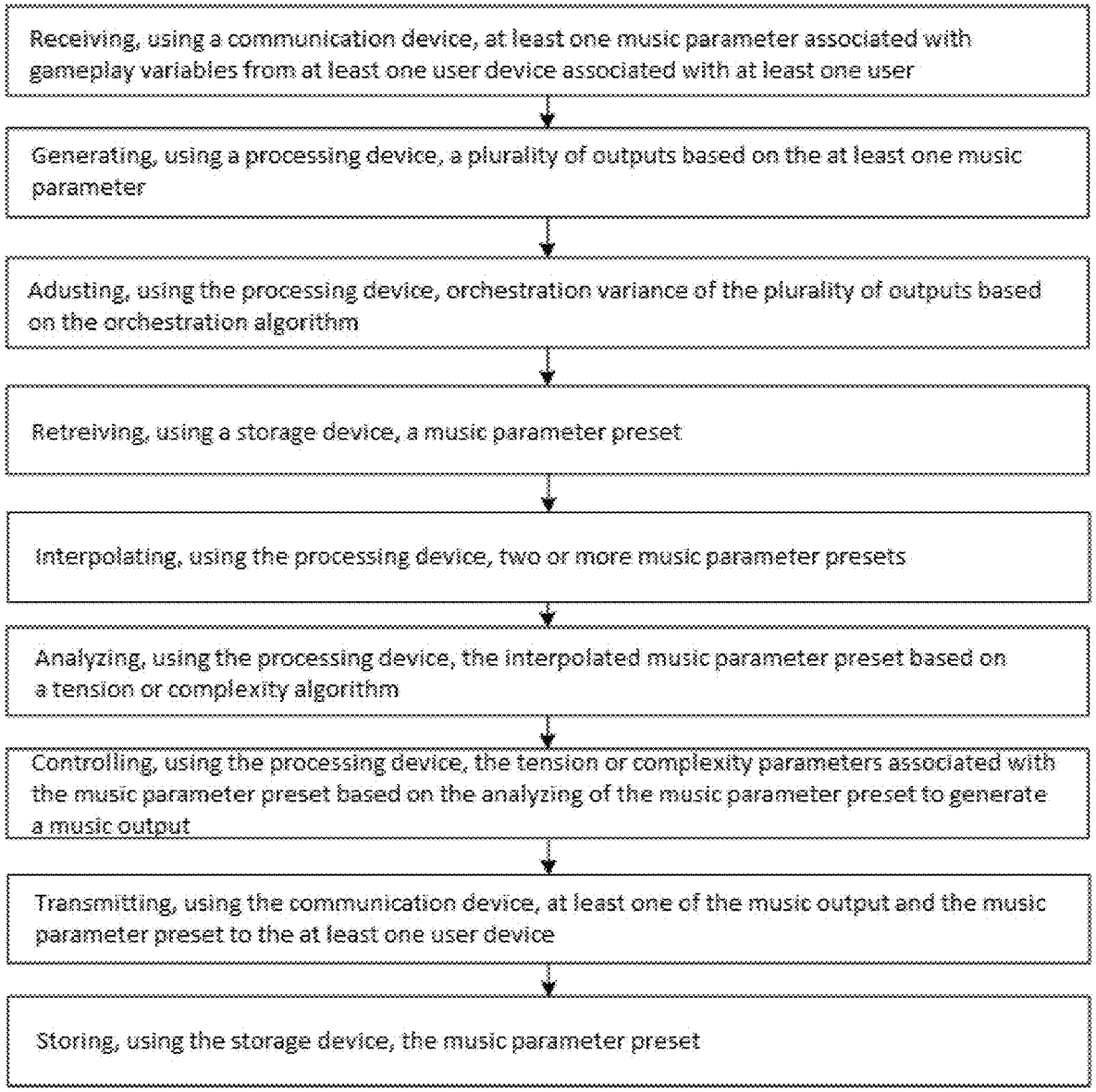
FIG. 3 is a flow chart diagram of a method for facilitating generating music in real-time for videogames using progressive parameters, in accordance with some embodiments.

FIG. 3 is a flow chart diagram of a method for facilitating generating music in real-time for videogames using progressive parameters, in accordance with some embodiments. Accordingly, the method may include receiving, using a communication device, at least one music parameter associated with gameplay variables from at least one user device associated with at least one user. Further, the at least one user device may include a laptop, a mobile, a personal computer, etc. Further, the at least one music parameter may be associated with real-time music variables (or the gameplay variables) of a video game.

Further, the method may include generating, using a processing device, a plurality of outputs based on the at least one music parameter. Further, the plurality of outputs may include a melody output, harmony output, and percussion output.

Further, the method may include adjusting, using the processing device, orchestration variance of the plurality of outputs based on an orchestration algorithm.

Further, the method may include retrieving, using a storage device, a music parameter preset. Further, in an embodiment, the method may include receiving, using the communication device, the music parameter preset from the at least one user device.

Further, the method may include interpolating, using the processing device, two or more music parameter presets. Further, the music parameter preset may be established by the at least one user, or loaded into the preset storage. Further, the music parameter preset may be exported as data. Further, in an embodiment, the disclosed system device may be configured for actively transforming the music parameter preset according to the music behavior and the parameters coming from a videogame gameplay state.

Further, the method may include analyzing, using the processing device, the interpolated music parameter preset based on a tension or complexity algorithm. Further, the tension or complexity algorithm may facilitate changing of musical generation features linearly and incrementally. The addition of tension or complexity, not only on progression length, chord type, and pitch-class addition/subtraction, but also on rhythmical development offers a full range of musical output starting from basic tonal progressions and simple meter and/or slow rhythmic activity to an atonal, dense, intense, and rhythmically, melodically, and harmonically complex music stream.

Further, the method may include controlling, using the processing device, the tension or complexity parameters associated with the music parameter preset based on the analyzing of the interpolated music parameter preset to generate a music output.

Further, the method may include transmitting, using the communication device, at least one of the music output and the music parameter preset to the at least one user device.

Further, the method may include storing, using the storage device, the music parameter preset.

Further, in some embodiments, the method may include retrieving, using the storage device, one or more parameter presets. Further, the analyzing of the interpolated music parameter preset may be based on the stochastic algorithm. Further, the stochastic algorithm may include a machine learning algorithm. Further, the stochastic algorithm may be employed for generating human-like performance. Further, the stochastic algorithm may be configured for facilitating adapting features in the real-time music generation stream progressively to real-time variables. Further, the real-time variables may be coming from a videogame.

Figure 4:
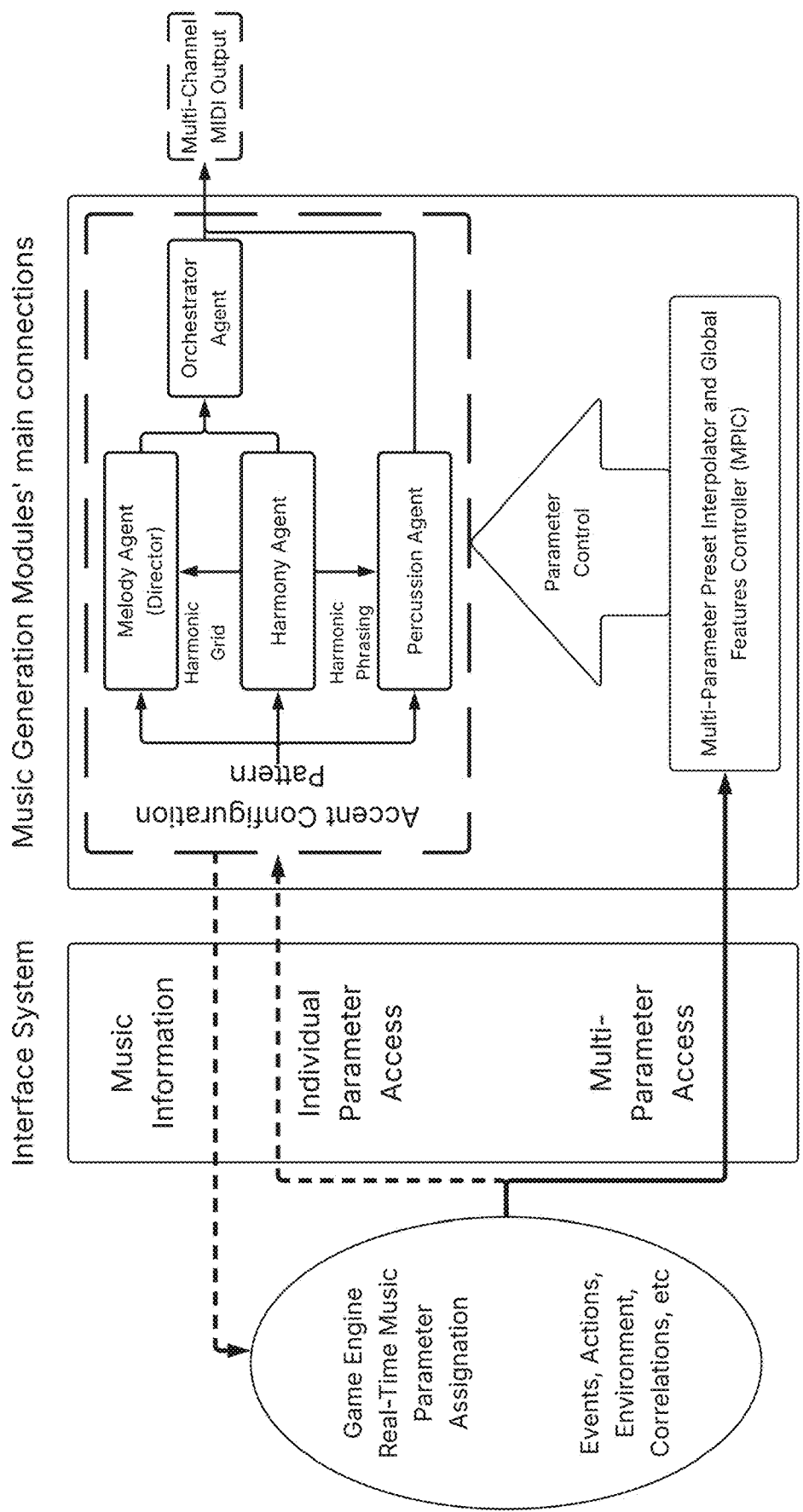
FIG. 4 illustrates a progressive algorithmic adaptive music generator for videogames for facilitating generating music in real-time for videogames using progressive parameters, in accordance with some embodiments.

FIG. 4 illustrates a progressive algorithmic adaptive music generator for videogames for facilitating generating music in real-time for videogames using progressive parameters, in accordance with some embodiments.

Figure 5:
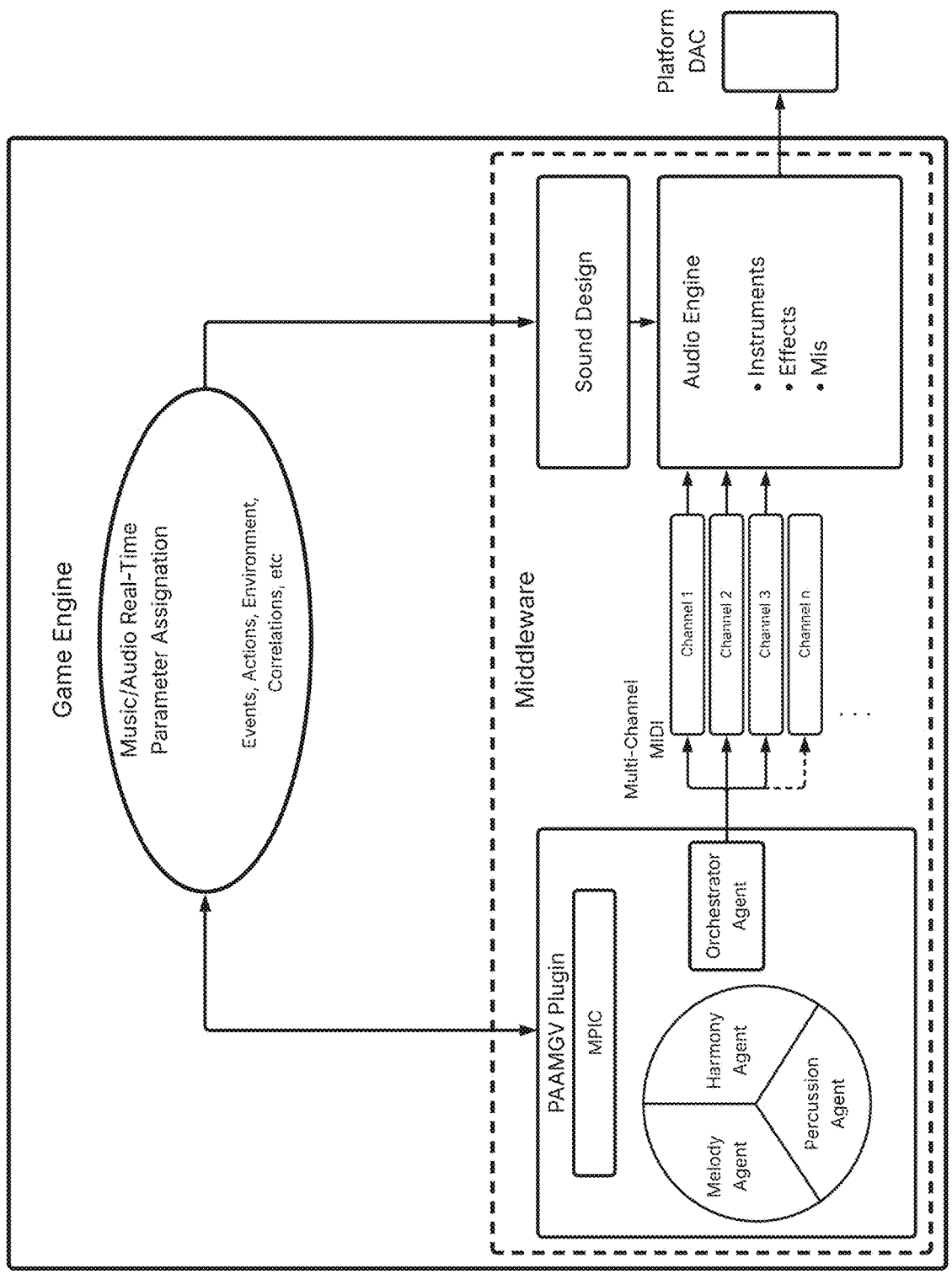
FIG. 5 illustrates a progressive algorithmic adaptive music generator for videogames using instruments within middleware for facilitating generating music in real-time for videogames using progressive parameters, in accordance with some embodiments.

FIG. 5 illustrates a progressive algorithmic adaptive music generator for videogames using instruments within middleware for facilitating generating music in real-time for videogames using progressive parameters, in accordance with some embodiments.

Figure 6:
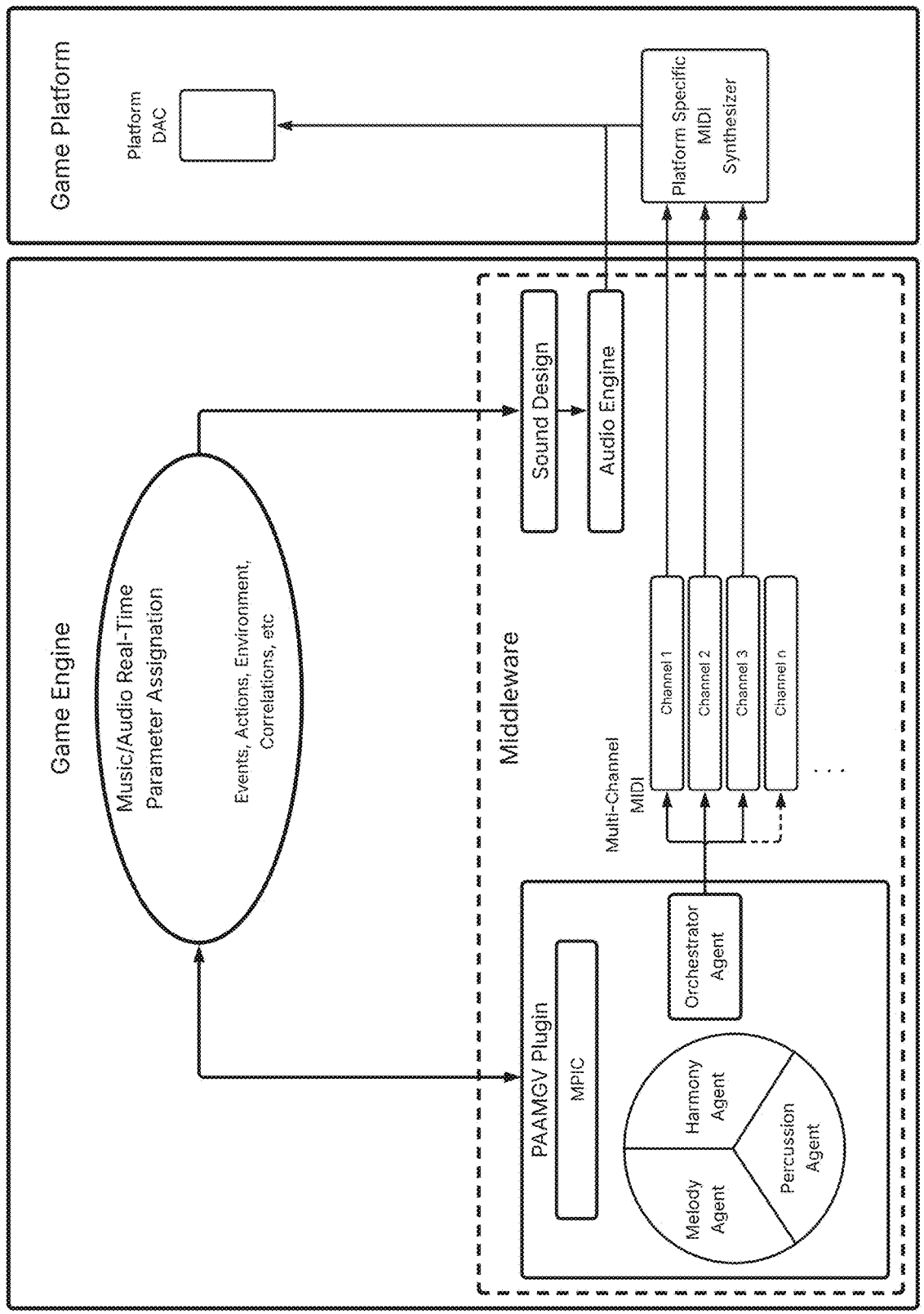
FIG. 6 illustrates a progressive algorithmic adaptive music generator for videogames using instruments from the game platform for facilitating generating music in real-time for videogames using progressive parameters, in accordance with some embodiments.

FIG. 6 illustrates a progressive algorithmic adaptive music generator for videogames using instruments from the game platform for facilitating generating music in real-time for videogames using progressive parameters, in accordance with some embodiments.

Figure 7:
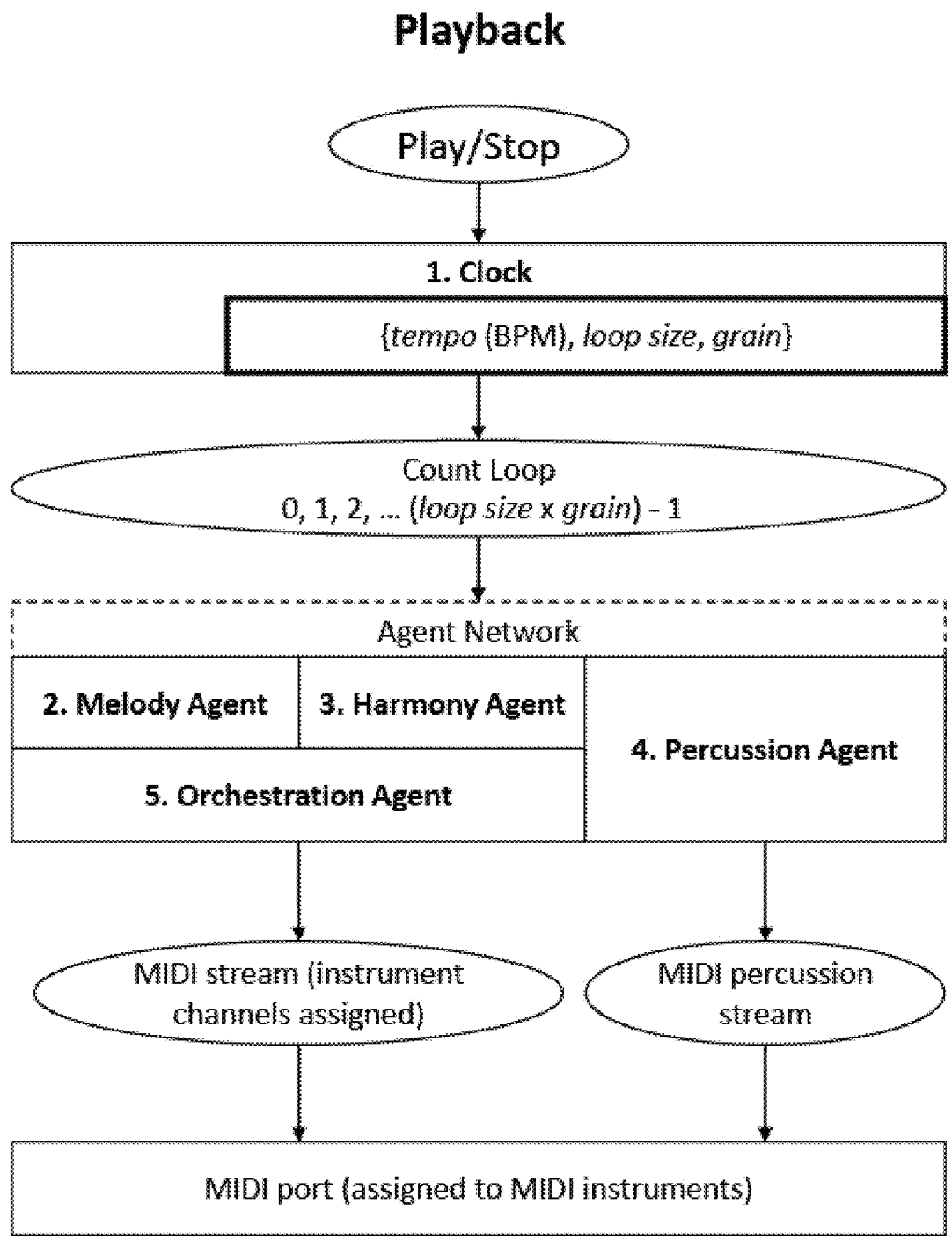
FIG. 7 is a flow diagram showing an overview of how playback is generated by the progressive algorithmic adaptive music generator for videogames.

FIG. 7 is a flow diagram showing an overview of how playback is generated by the progressive algorithmic adaptive music generator for videogames. Based on the tempo (beats per minute), loop size, and grain from the clock, the Count Loop is generated, with each index representing a distinct musical element (note, chord, percussion action). The Count Loop is passed into the Melody Agent, Harmony Agent, and Percussive Agent, which produces a midi stream for melody and harmony, and a midi stream for percussion, which is then combined to create a complete MIDI stream.

Figure 8:
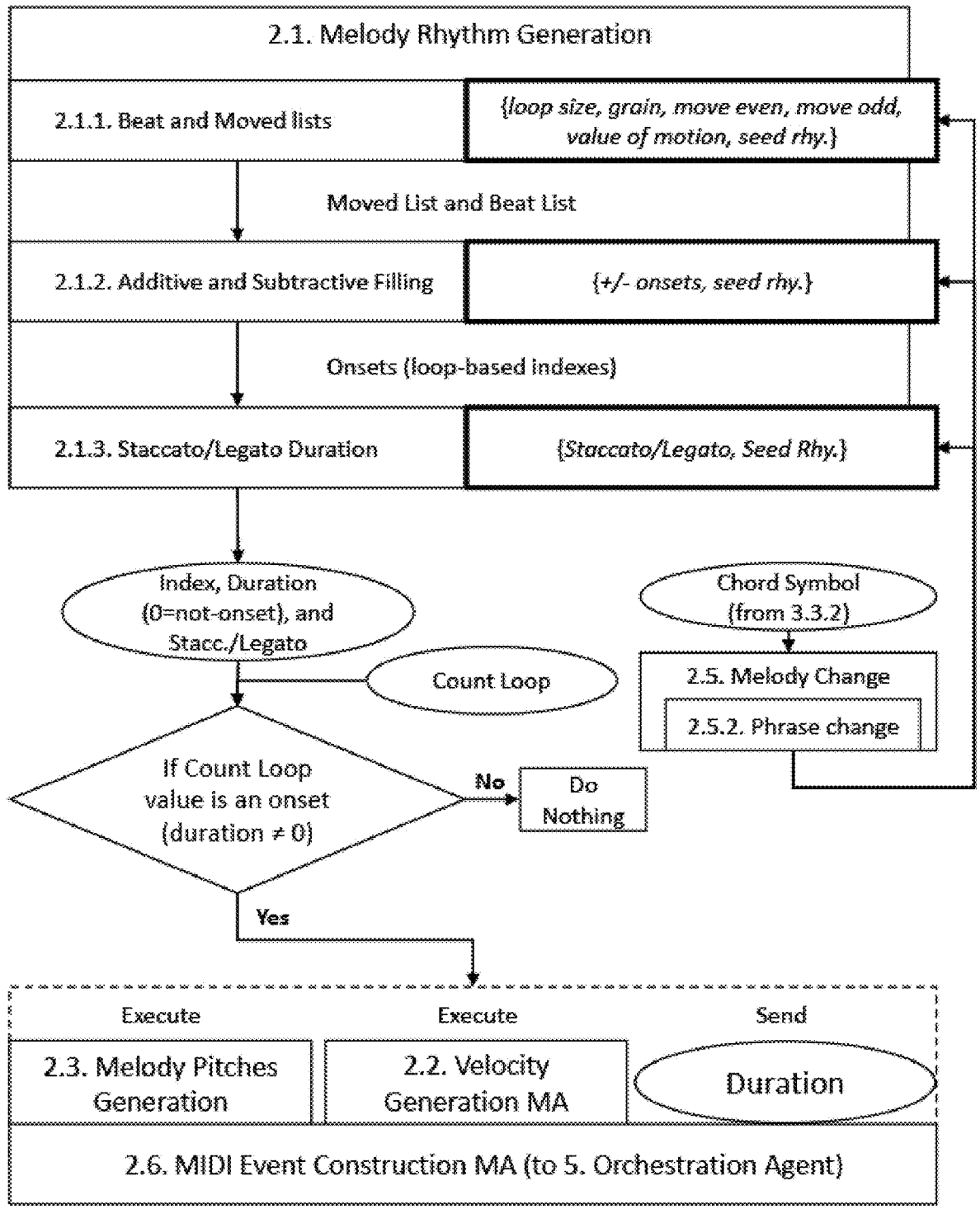
FIG. 8 is a flow diagram showing how the melody rhythm is generated and how this is passed to the melody pitch generation, melody velocity generation, and eventually to the orchestration agent.

FIG. 8 is a flow diagram showing how the melody rhythm is generated and how this is passed to the melody pitch generation, melody velocity generation, and eventually to the orchestration agent. Boxes outlined in bold indicate inputs passed into the function, after which outputs are passed down to the next element.

Figure 9:
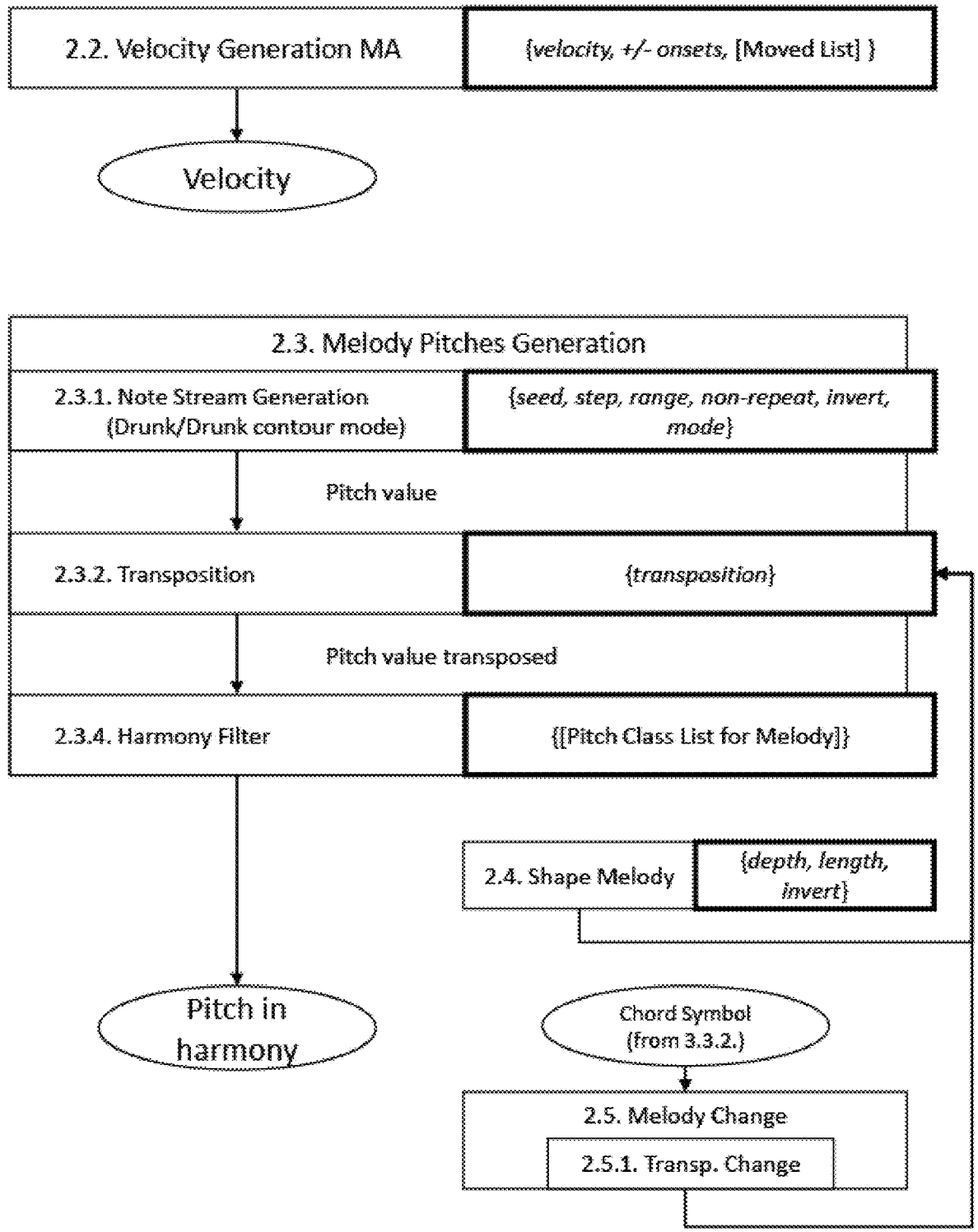
FIG. 9 is a flow diagram showing melody velocity generation and melody pitch generation.

FIG. 9 is a flow diagram showing melody velocity generation and melody pitch generation.

Figure 10:
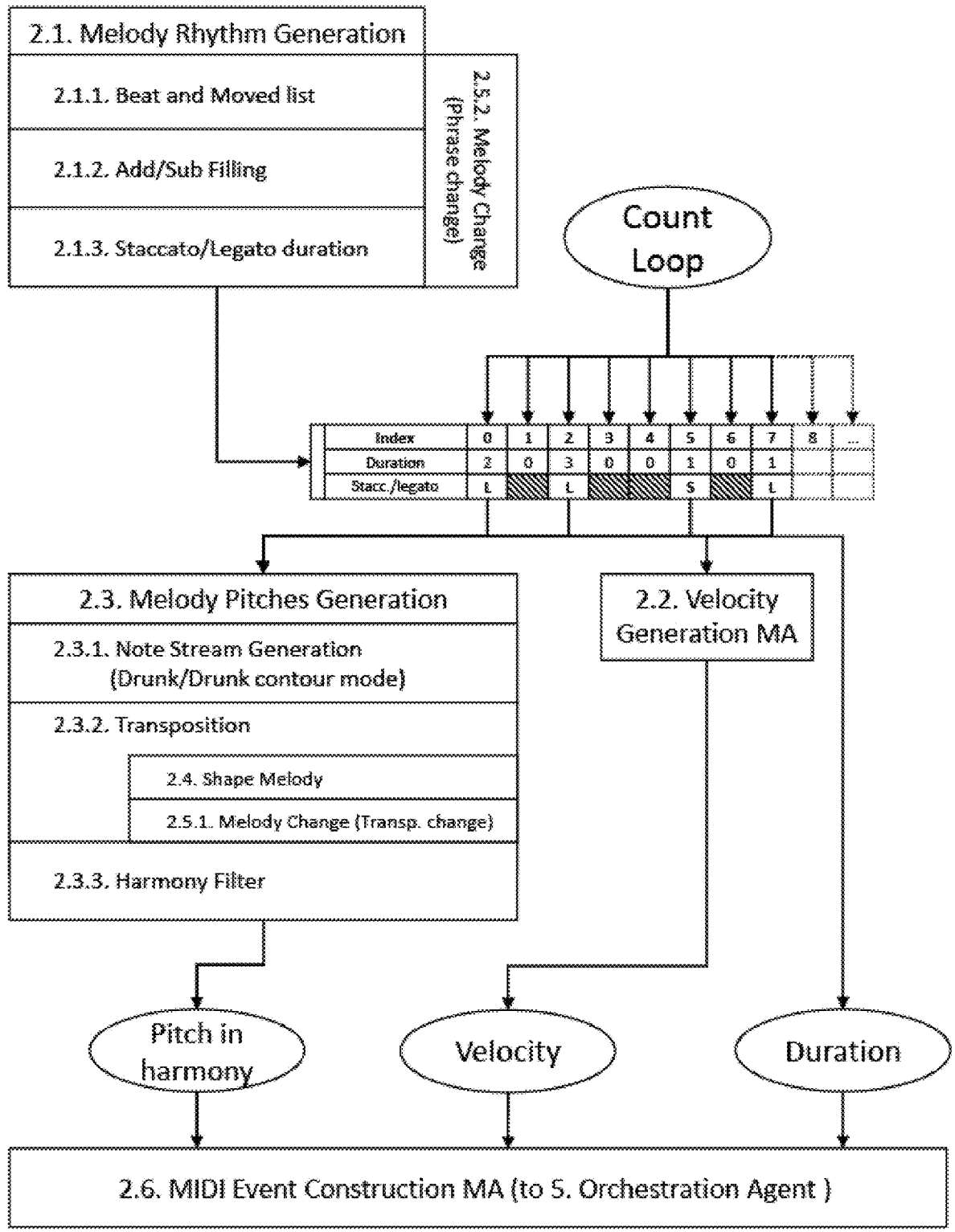
FIG. 10 is a flow diagram showing an overview of the melody agent, including the interaction between melody rhythm generation, melody pitch generation, melody velocity generation, and what is passed to the orchestration agent.

FIG. 10 is a flow diagram showing an overview of the melody agent, including the interaction between melody rhythm generation, melody pitch generation, melody velocity generation, and what is passed to the orchestration agent.

Figure 11:
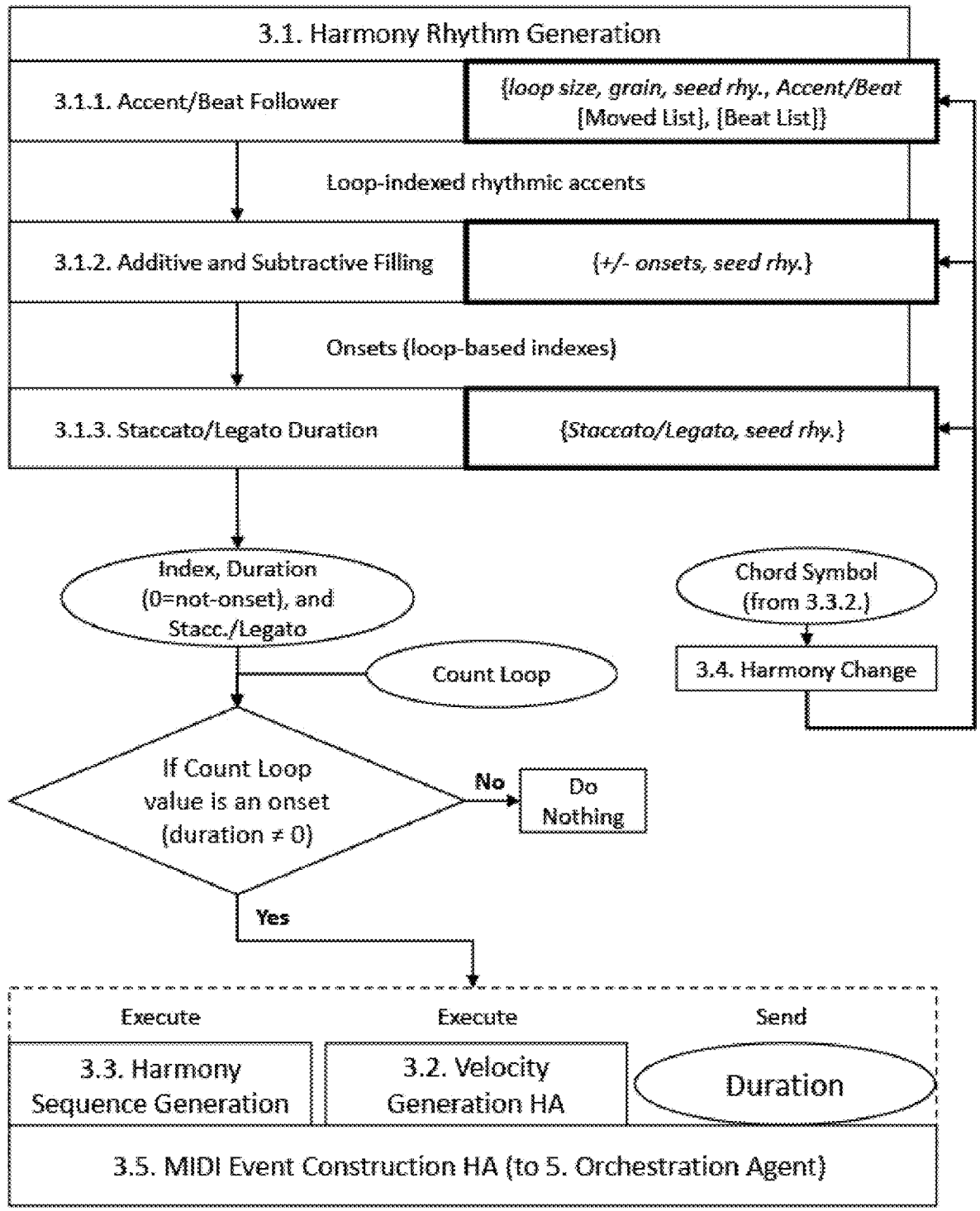
FIG. 11 is a flow diagram showing how the harmony rhythm is generated and how this is passed to the harmony sequence generation, harmony velocity generation, and eventually to the orchestration agent.

FIG. 11 is a flow diagram showing how the harmony rhythm is generated and how this is passed to the harmony sequence generation, harmony velocity generation, and eventually to the orchestration agent.

Figure 12:
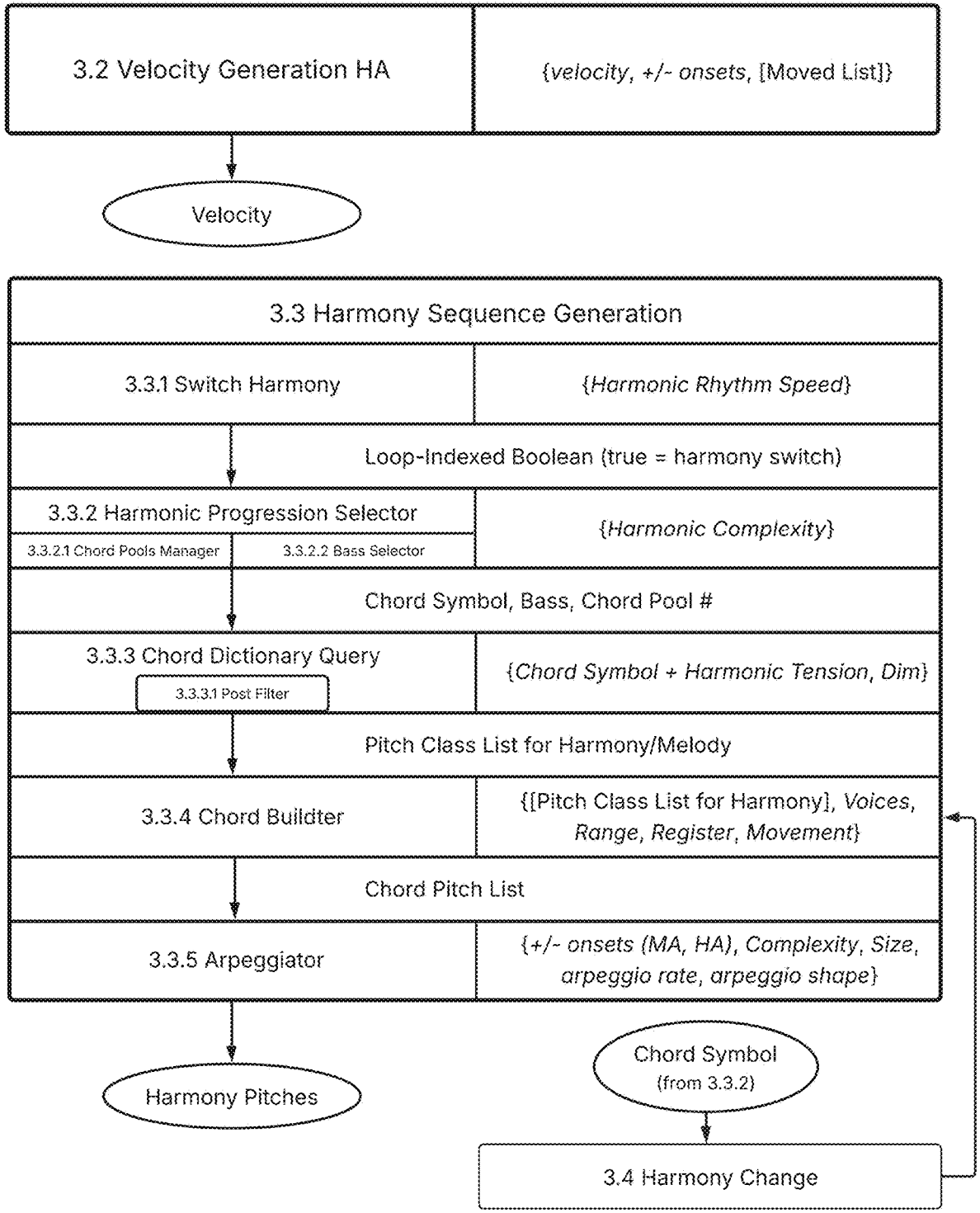
FIG. 12 is a flow diagram showing harmony velocity generation and harmony sequence generation.

FIG. 12 is a flow diagram showing harmony velocity generation and harmony sequence generation.

Figure 13:
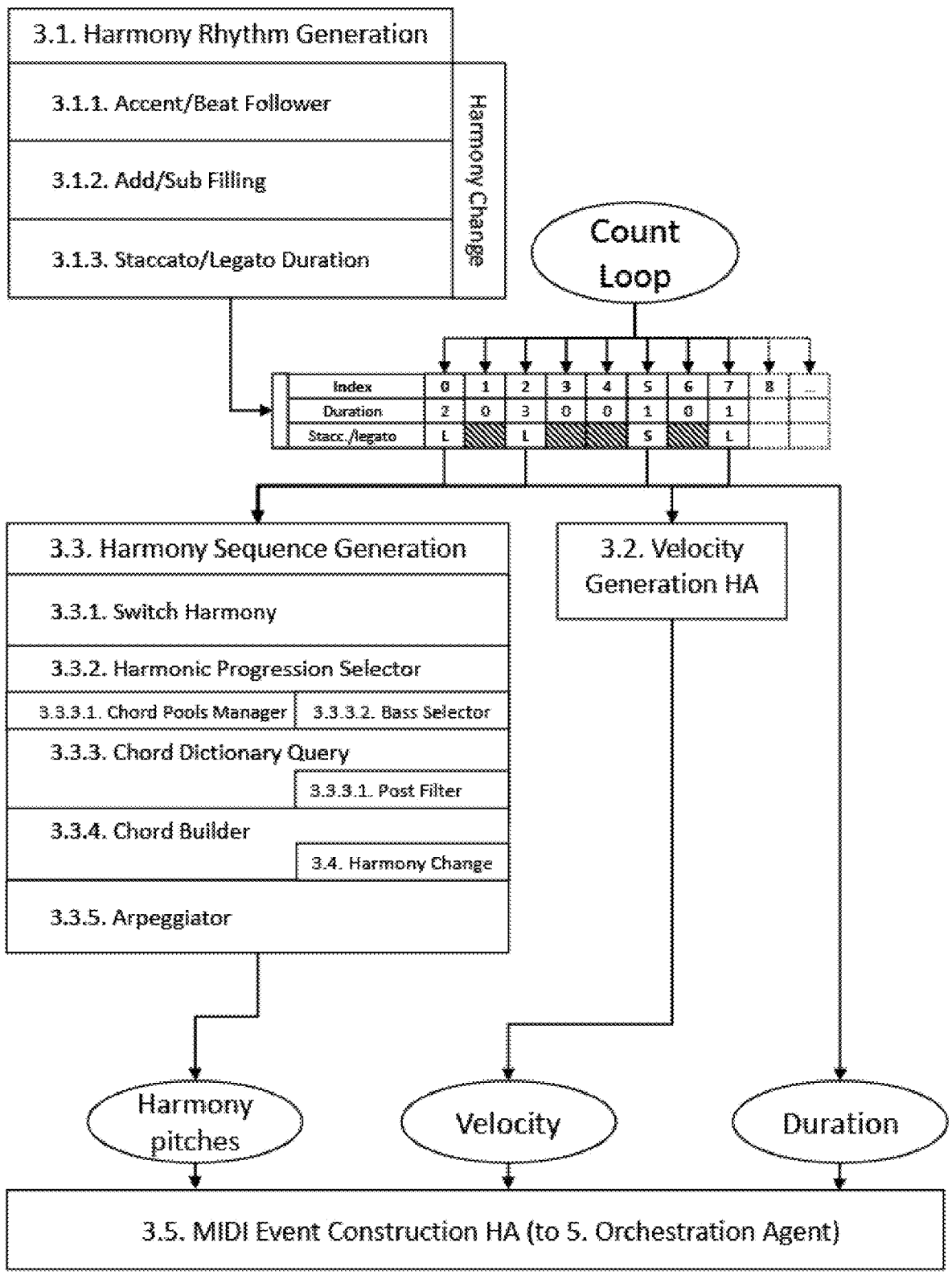
FIG. 13 is a flow diagram showing an overview of the harmony agent, including the interaction between harmony rhythm generation, harmony sequence generation, harmony velocity generation, and what is passed to the orchestration agent.

FIG. 13 is a flow diagram showing an overview of the harmony agent, including the interaction between harmony rhythm generation, harmony sequence generation, harmony velocity generation, and what is passed to the orchestration agent.

Figure 14:
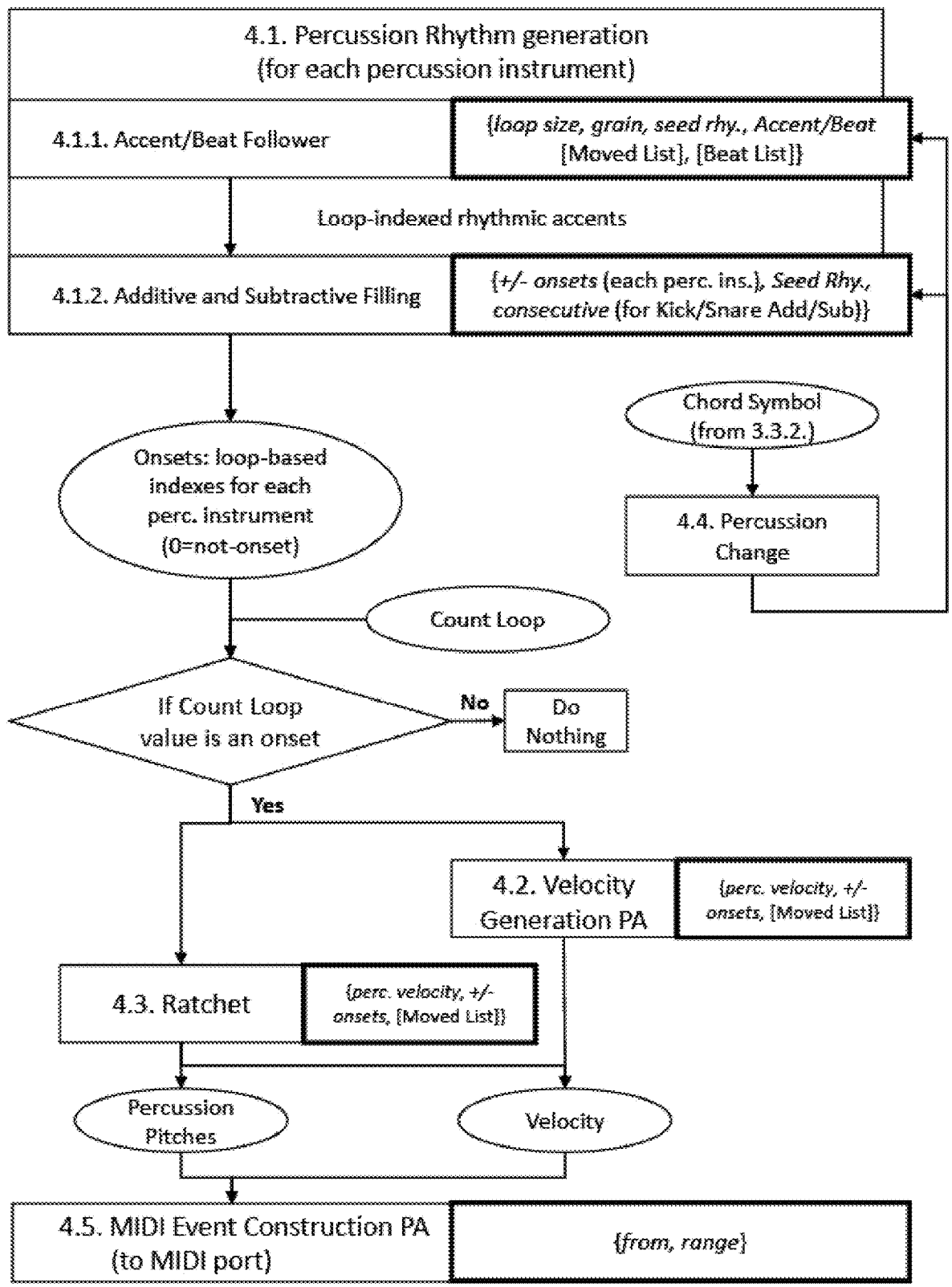
FIG. 14 is a flow diagram showing how the percussive rhythm is generated and how this is passed to the percussive pitch generation, percussive velocity generation, and eventually to the orchestration agent.

FIG. 14 is a flow diagram showing how the percussive rhythm is generated and how this is passed to the percussive pitch generation, percussive velocity generation, and eventually to the orchestration agent.

Figure 15:
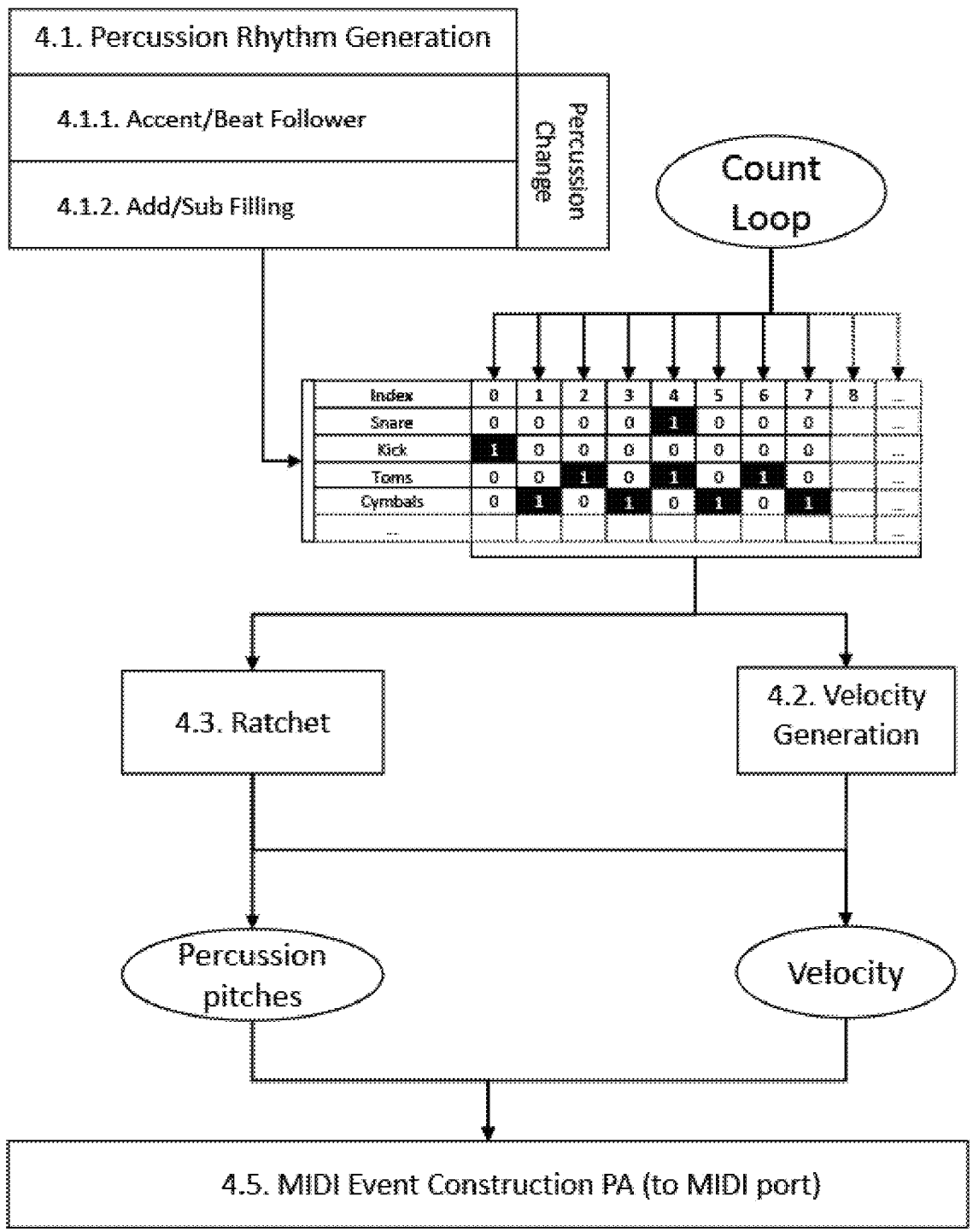
FIG. 15 is a flow diagram showing an overview of the percussive rhythm agent, including the interaction between percussion pitches, percussive velocity generation, and what is passed to the orchestration agent.

FIG. 15 is a flow diagram showing an overview of the percussive rhythm agent, including the interaction between percussion pitches, percussive velocity generation, and what is passed to the orchestration agent.

Figure 16:
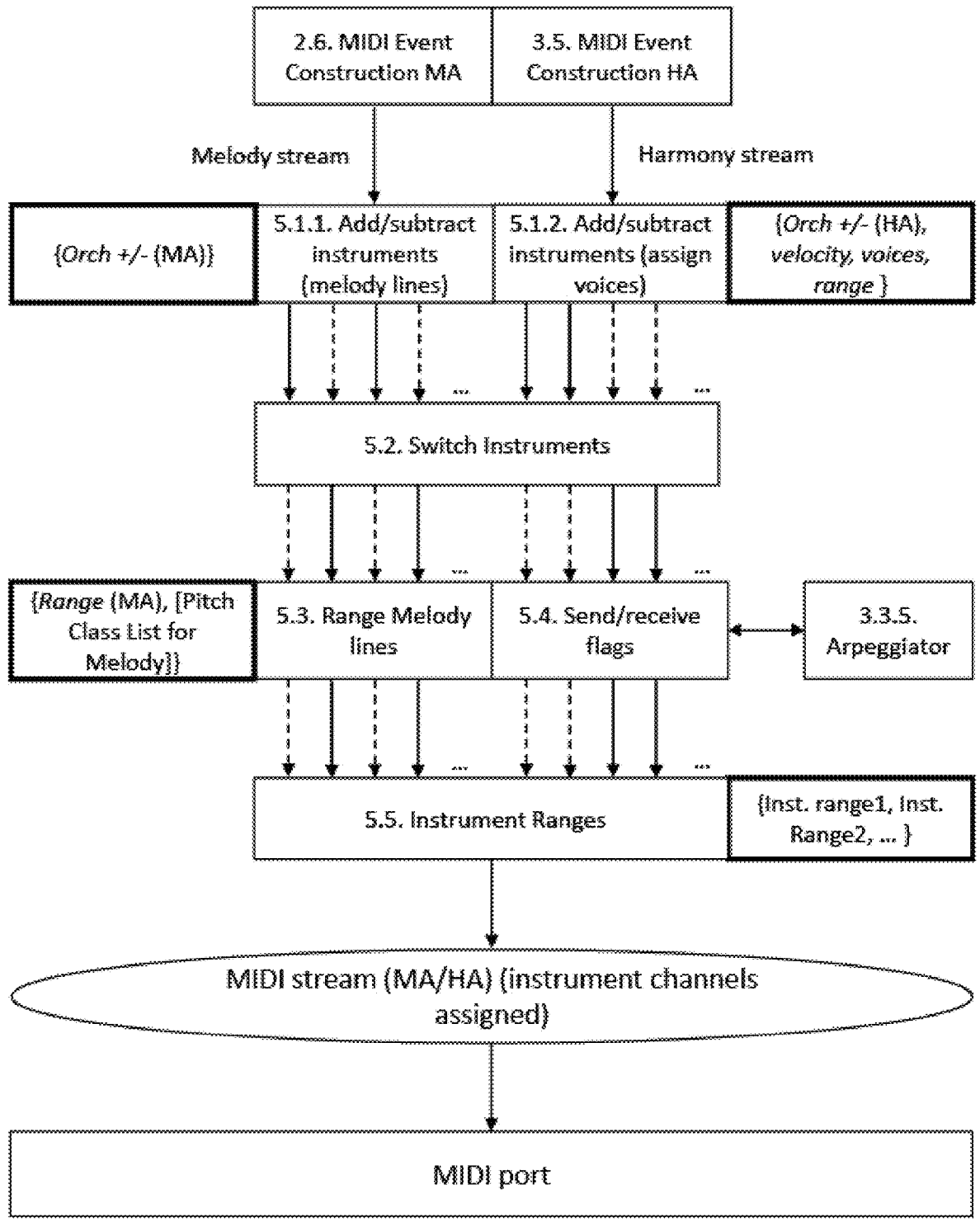
FIG. 16 is a flow diagram showing how the melody and harmony MIDI events are combined by the orchestration agent to produce a MIDI stream.

FIG. 16 is a flow diagram showing how the melody and harmony MIDI events are combined by the orchestration agent to produce a MIDI stream.

Figure 17:
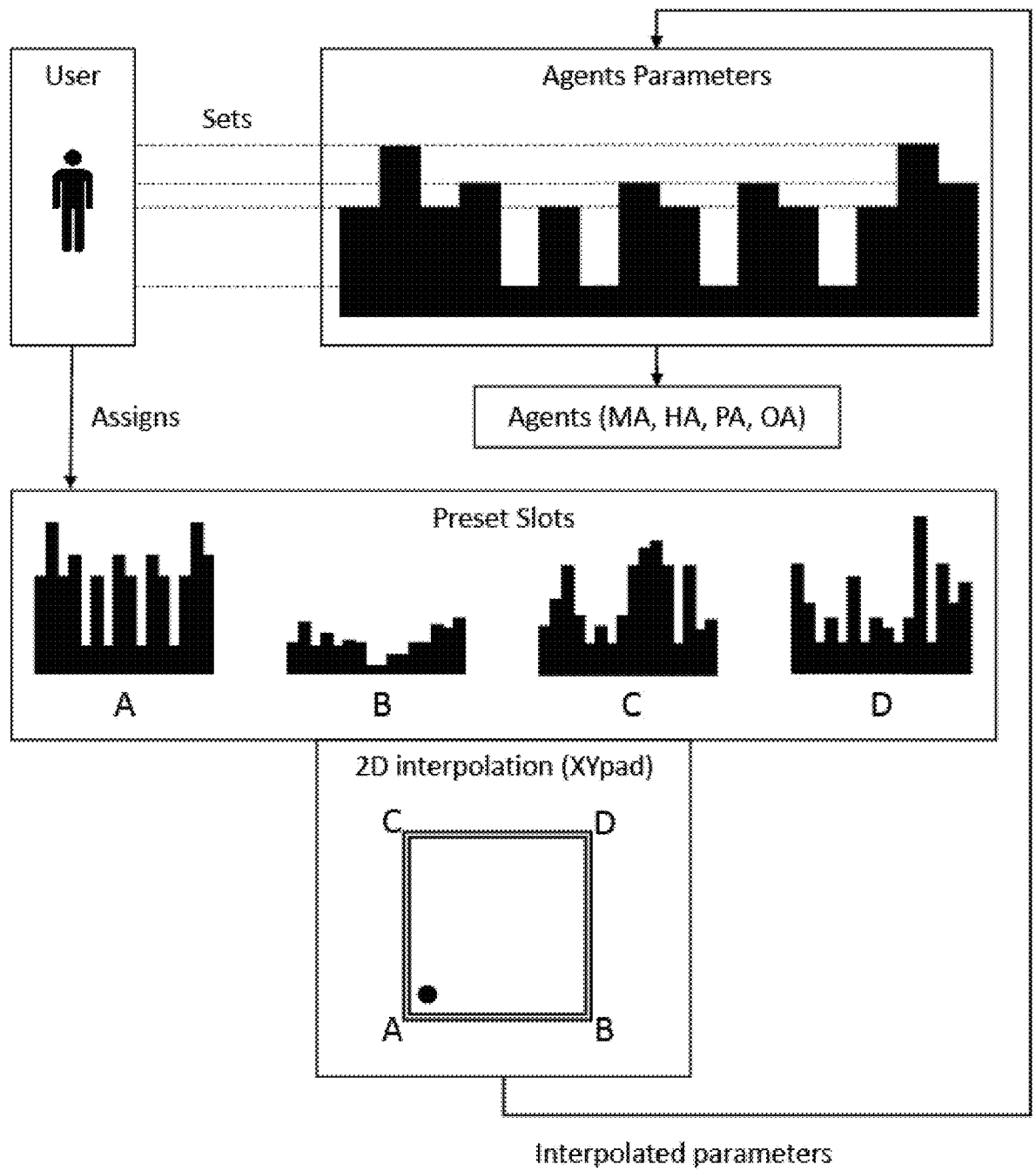
FIG. 17 is a flow diagram showing how the graphical 2D interpolation input is translated into parameters that modify music generation.

FIG. 17 is a flow diagram showing how the graphical 2D interpolation input is translated into parameters that modify music generation.

Figure 18:
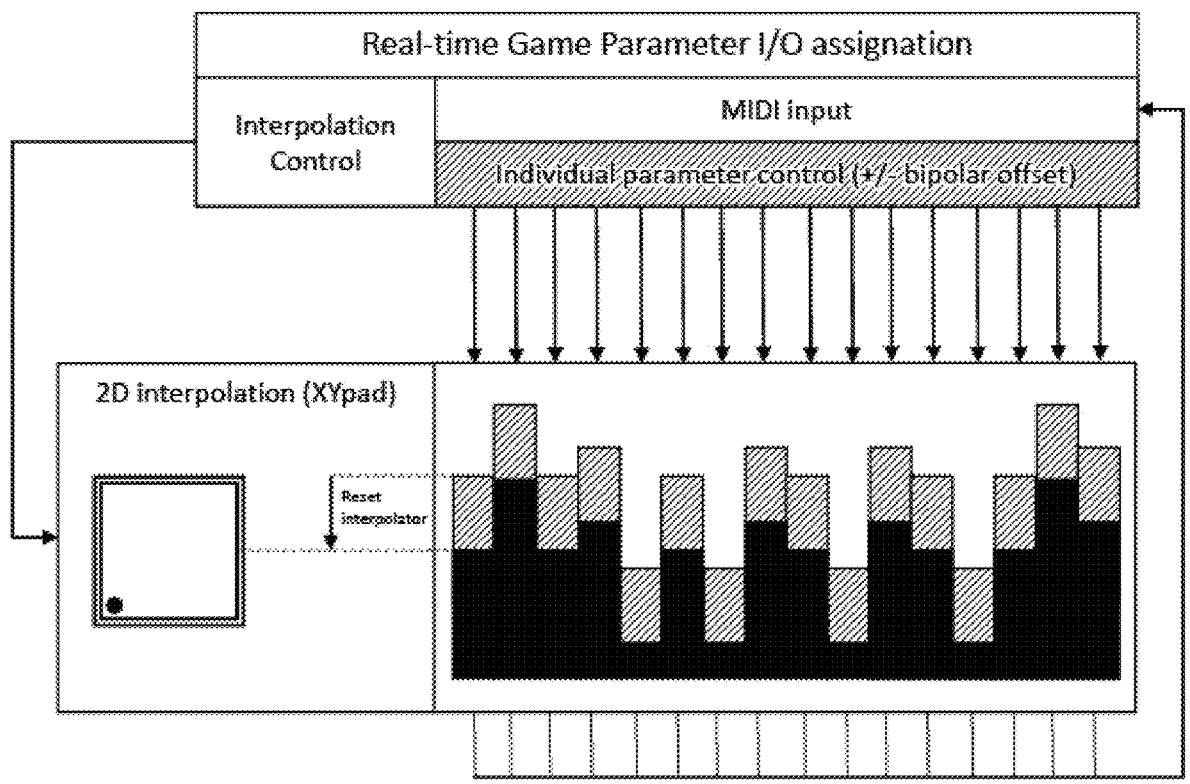
FIG. 18 is a flow diagram showing how interpolation control is applied to modify base MIDI input.

FIG. 18 is a flow diagram showing how interpolation control is applied to modify base MIDI input.

Figure 19:
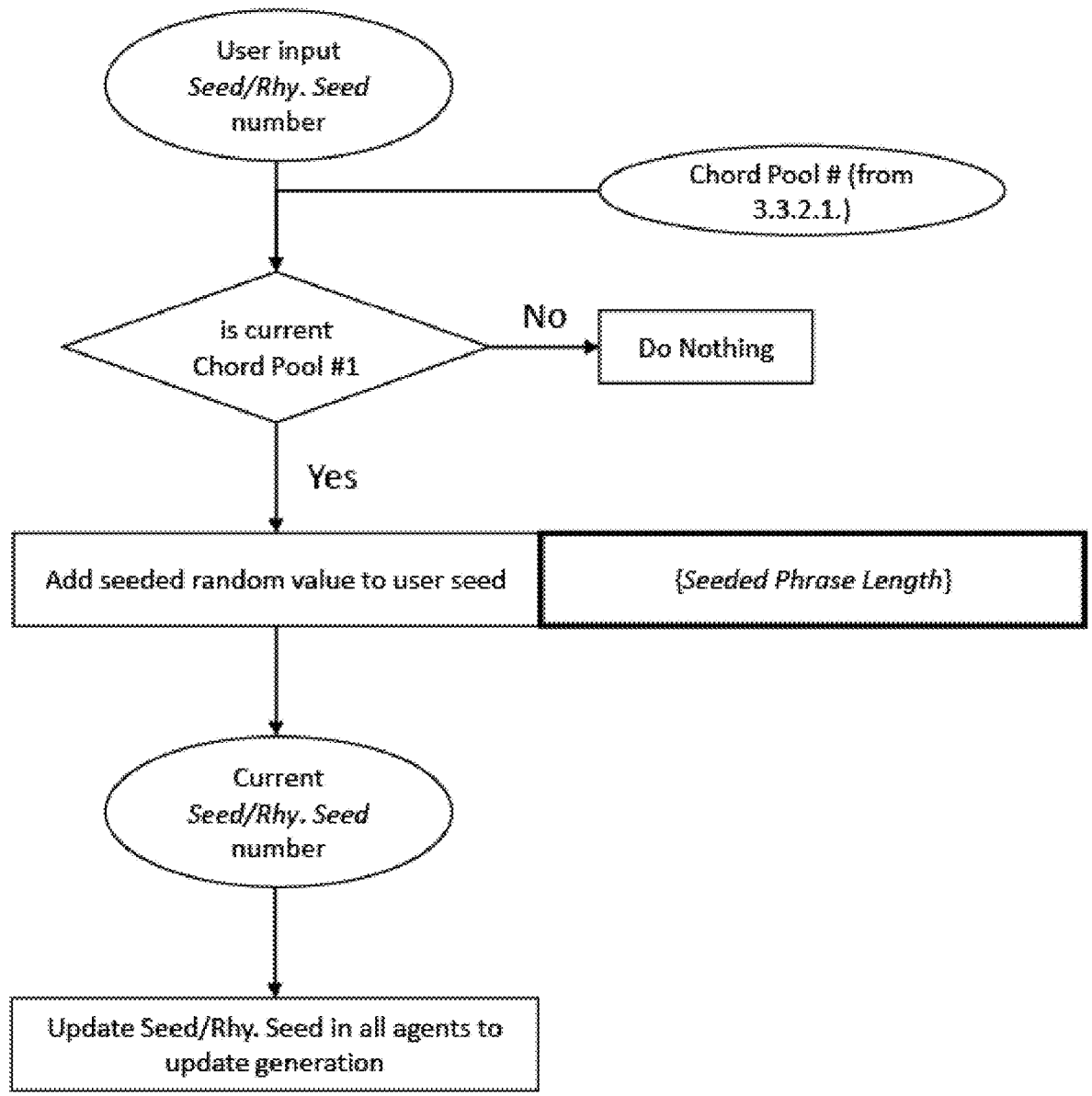
FIG. 19 is a flow diagram showing how user input to modify the music is applied at the beginning of chord progressions to ensure random changes are not applied mid-phrase.

FIG. 19 is a flow diagram showing how user input to modify the music is applied at the beginning of chord progressions to ensure random changes are not applied mid-phrase.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general-purpose graphics processor-based systems, multiprocessor systems, microprocessor-based or programmable consumer electronics, application-specific integrated circuit-based electronics, minicomputers, mainframe computers, and the like.

Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer-readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid-state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the invention has been explained in relation to its preferred embodiment, it is to be understood that many other possible modifications and variations can be made without departing from the spirit and scope of the invention.

What is claimed is:

1. A networked system for generating progressive algorithmic adaptive music in video games based on dynamic gameplay parameters comprising:
An agent network,
A multi-parameter preset interpolator and global features controller,
A system user interface,
  wherein
  the agent network comprises:
    one or more melody agents,
    one or more harmony agents,
    one or more percussion agents, and
    one or more orchestrator agents;
  the multi-parameter preset interpolator and global features controller comprises:
    one or more microprocessors,
    non-transitory storage media,
    a plurality of parameter presets stored within the non-transitory storage media, and
    a plurality of selectable global features stored within the non-transitory storage media; and
  the system user interface comprises:
    user controls,
    one or more display devices, and
    one or more user input devices;
  and wherein
  the system user interface is employed to select one or more parameter presets from among those available to the multi-parameter preset interpolator and global features controller;
  the system user interface is employed to select one or more features from among those available to the multi-parameter preset interpolator and global features controller;
  the system user interface is employed to select one or more agent configuration settings of each agent in the agent network;
  the multi-parameter preset interpolator and global features controller receives a plurality of parameters from a client game system;
  the multi-parameter preset interpolator and global features controller interpolates the selected parameter presets while applying the selected global features and provides the interpolated values to the agent network and user interface;

the multi-parameter preset interpolator and global features controller provides the plurality of parameters from the client game system to the agent network;

the agent network processes the received preset, global features, and client game system parameters provided in generating a note-by-note, real-time sequence as musical output; and the agent network provides the musical output to the client game system.

2. The method of claim 1, further wherein one or more melody agents generates a note-by-note real-time sequence that progresses based on the parameters provided by the client game system and the system user interface, lasting one loop or musical measure and repeating or varying in subsequent loops, the sequence generated by applying a shape algorithm to generate a relative contour with factors comprising a contour length expressed in loop size units or fractions of loop size units controlled by a linear-value parameter and a relative pitch range controlled by a linear-value parameter, a seeded random walk algorithm, a seeded random walk contour algorithm wherein a pitch stream is chosen from a harmony grid generated by the one or more harmony agents and the algorithm is re-seeded at the end of the loop with stream factors comprising:

the relative pitch range of the relative contour, a relative step (a maximum interval or transition between notes) controlled by a linear-value parameter, and a pseudo-random generator's seed controlled by a linear-value parameter, a transposition amount controlled by a linear-value parameter, a sequence length in number of loops controlled by a linear-value parameter, a repetition toggle parameter set to either allow or prevent repetition, an inversion toggle parameter that performs a musical inversion of the note sequence, a melody rhythm algorithm that generates and manages a base accent configuration pattern to be used by other agents and the place and number of onsets in the loop timeline for the note sequence, comprising:

an odd onset shifting linear-value parameter to displace from none to all the odd beats present in a loop, an even onset second onset shifting linear-value parameter to displace from none to all even beats present in a loop, a beat shifting algorithm to create a sequence of beats shifting either forward or backwards independently for odd and even beats controlled by a linear-value parameter, an odd beat toggle parameter to select the musical values to shift for odd beats, an even beat toggle parameter to select the musical values to shift for even beats, an onset algorithm to incrementally and linearly add or subtract onsets of different musical values to augment or decrement rhythmic activity in a loop linear-value parameter, and a note length algorithm that uses seeded random sequences on available onsets to apply staccato or legato note lengths, controlled by a linear-value parameter, a velocity algorithm that provides a range of humanized amplitudes for randomized onsets and maintains the accent configuration pattern provided by the rhythm algorithm, controlled by a linear-value parameter, a phrasing algorithm that automatically adds or subtracts values from other parameters to generate one or more melodic phrases based on a harmonic progression produced by the harmony agent, and a variation algorithm that automatically changes register and note movement in the melody depending on how much it has been repeated.

3. The method of claim 2, further wherein the one or more harmony agents generates and controls (in real time) a harmony grid, a harmonic progression, and a sequence of chords, based on the parameters provided by the client game system and the system user interface the grid, progression, and sequence generated by applying a harmonic tension algorithm controlled by a linear-value parameter that adds or subtracts pitch classes from the current harmony grid, a harmonic complexity algorithm controlled by a linear-value parameter that selects one or more progression probabilities using incrementally complex choices in incrementally complex levels, a harmony chord rhythm algorithm that follows and constructs from the base accent configuration pattern provided by the melody rhythm algorithm to generate one or more harmony chords onsets, comprising:

a beat algorithm which rhythmically adheres to the musical beat, to the base accent configuration pattern provided by the melody rhythm algorithm, and/or any point in between as controlled by linear-value parameter, a rhythmic activity onset controlled by a linear-value parameter which incrementally adds or subtracts onsets to augment or decrement rhythmic activity, and a chord length algorithm controlled by a linear-value parameter that uses seeded random sequences on available onsets to apply staccato or legato (short or held) durations to chords, a harmony chord velocity algorithm controlled by a linear-value parameter which provides a range of humanized amplitudes for each chord note maintaining the accent configuration pattern provided by the melody rhythm algorithm, a harmony voicing algorithm which provides and distributes a plurality of chord voices, a relative pitch range between each of the sequence of chords as controlled by a linear-value parameter, a pitch register for the sequence of chords as controlled by a linear-value parameter, a harmony toggle value which selects minor or major harmonies, a chord movement algorithm controlled by a linear-value parameter which generates or suppresses fluctuation in the pitch register for the sequence of chords, and a harmony change algorithm which adds an additional onset to the one or more harmony chord onsets and the pitch register, applied after a random number of the one or more melodic phrases.

4. The method of claim 3, further wherein the one or more percussion agents generates a percussion sequence, based on the parameters provided by the client game system and the system user interface, the grid, progression, and sequence are generated by applying a percussion chord velocity algorithm controlled by a linear-value parameter which provides a range of humanized amplitudes for each percussion onset maintaining the accent configuration pattern provided by the melody rhythm algorithm, a percussion rhythm algorithm that generates the rhythmic sequence in the loop for each percussion instrument from the base accent configuration pattern provided by the melody rhythm algorithm comprising:

a rhythm algorithm which rhythmically adheres to the beat shifting algorithm or to the base accent configuration pattern provided by the melody rhythm algorithm, subdivided with one or more grains per beat as controlled by a linear-value parameter, and one or more percussive onset parameters, determined by a linear-value parameter for each of one or more percussion instruments which incrementally add or subtract onsets to augment or decrement the percussion instrument's rhythmic activity, a kick-snare algorithm controlled by a linear-value parameter which balances the alternation between kick drum and snare, and a phrasing algorithm which automatically adds or subtracts values from other percussion parameters to generate one or more percussive phrases based on the harmonic progression produced by the harmony agent.

5. The method of claim 1, further wherein the one or more orchestrator agents selects and assigns musical events produced from the melody agent and the harmony agent to a plurality of instruments to produce a plurality of musical layers by applying a melody layer algorithm which adds or subtracts voice layers and places them in a register based on the pitch register generated by the melody agent and the harmony grid, selected by setting a relative pitch range based on a linear-value parameter and setting an amount of voices based on another linear-value parameter, a chord layer algorithm controlled by a linear-value parameter assigns the chord voices coming from the harmony agent to one or more instruments, and a layer manipulation algorithm that, based on a linear-value parameter, adds or subtracts randomly from the plurality of musical layers.

6. The method of claim 1, further wherein the multi-parameter preset interpolator and global features controller applies an interpolation algorithm which sends one or more multi-parameter values corresponding to their interpolated value between selected presets, seamlessly transitioning and continuously cross-fading among musical features following real-time gameplay parameters, allowing independent modification of single parameters, factors comprising:

a preset storing section where an amount of presets are set and individual linear-value parameters for all the agents are stored within preset slots, an interpolation space in which the preset values are located and interpolated, using a multi-dimensional coordinate space (such as a 2D plane) in which the cursor distance to the multi-parameter preset location is used to set the one or more interpolated multi-parameter values, a reset toggle to default to the one or more original interpolated multi-parameter values when individual values have diverged from the original interpolated preset values through individual parameter change, a global tempo controlled by a linear-value parameter, a global loop size in beats controlled by a linear-value parameter, a global grain (the maximum subdivision of the beat) controlled by a linear-value parameter, a seed for all pitch-related random number generators controlled by a linear-value parameter, a seed for all rhythm-related random number generators controlled by a linear-value parameter, and a tonic center pitch controlled by a linear-value parameter.

7. The method of claim 2, further wherein the transposition amount is set by a transposition algorithm that analyzes a range of previous pitches and their duration from the pitch stream generated by the seeded random walk contour algorithm, and the transposition amount is applied after one or more of the melodic phrases from the phrasing algorithm.

8. The method of claim 2, further wherein a melody MIDI event stream is produced based on the pitch stream from the seeded random walk contour algorithm, the note length, and the accent configuration pattern.

9. The method of claim 3, further applying a harmonic sequence algorithm comprising a harmony switch manager, a chord pools manager, a bass selector, a chord dictionary, a post filter, a chord builder, and an arpeggiator, further wherein the chord pools manager selects a chord symbol from the sequence of chords and the one or more progression probabilities from the complexity algorithm, the bass selector selects one or more possibilities for the lowest pitch used in the chord builder, based on the chord symbol and the one or more progression probabilities from the complexity algorithm, the chord dictionary contains a plurality of traditional chords mapped to one or more chord selection parameters and a tension parameter, the plurality of chord selection parameters and the tension parameter are passed into the chord dictionary to retrieve a pitch class harmony, the post filter shifts the pitch register for the sequence of chords by a set amount to introduce dissonance if a dissonance toggle is activated, the pitch class harmony, the plurality of chord voices, the pitch register for the sequence of chords, the relative pitch range, and the chord movement algorithm are processed by the chord builder to produce a chord pitch list, and the chord pitch list and outputs from the melody rhythm algorithm and harmony chord algorithm are passed into the arpeggiator to produce a harmonic chord or a harmonic arpeggio.

10. The method of claim 3, further wherein a harmony MIDI event stream is produced based on the one or more harmony chord onsets, the one or more progression probabilities from the complexity algorithm, and the pitch register.

11. The method of claim 4, further applying a ratchet algorithm which applies a ratchet for each of the one of more percussion instruments, not including the kick drum, wherein: a ratchet length, a ratchet onset, and a ratchet velocity are randomly generated within an ascending range, and the ratchet is more likely to be applied if the percussive onset parameter for an instrument is lower.

12. The method of claim 6, further wherein the multi-parameter preset interpolator and global features controller features full compatibility with the plugin format of either a gaming engine or an audio middleware integrated within the gaming engine to enable game developers to embed the generative music engine and its adaptive logic in compiled and built videogames.

13. The method of claim 6, wherein the multi-parameter preset interpolator and global features controller exists as a library to be manually or automatically referenced programmatically by the game developer.

14. The method of claim 6, wherein the input required by the system to generate original music is only parameters to manage real-time generative algorithms and seeds for pseudo-random number generators and does not include or involve a pre-made piece of music to operate.

15. The method of claim 6, wherein a video game engine can receive information about the music from the present invention, and assign its variables to activate, modify and/or correlate any gameplay feature according to music events or features such as onsets, pitch class (or pitch class distribution), melodic shape, progression, and phrasing, in addition to any individual parameter.

* * * * *